United States Patent [19]
Watanabe et al.

[11] Patent Number: 5,696,634
[45] Date of Patent: Dec. 9, 1997

[54] OBJECTIVE LENS FOR IMAGE PICKUP APPARATUS WITH SIZE OF IMAGE PICKUP SURFACE CHANGEABLE BETWEEN ASPECT RATIOS

[75] Inventors: Itaru Watanabe, Kawasaki; Yasunori Imaoka, Yokohama; Norio Nakai, Kawaguchi, all of Japan

[73] Assignee: Canon Kabushiki Kaisha, Tokyo, Japan

[21] Appl. No.: 580,277

[22] Filed: Dec. 27, 1995

[30] Foreign Application Priority Data

| Dec. 28, 1994 | [JP] | Japan | 6-339057 |
| Dec. 28, 1994 | [JP] | Japan | 6-339058 |
| Jan. 20, 1995 | [JP] | Japan | 7-26059 |
| Jan. 25, 1995 | [JP] | Japan | 7-30138 |

[51] Int. Cl.$^6$ .................................. G02B 15/14
[52] U.S. Cl. ................. 359/694; 359/696; 359/697
[58] Field of Search ..................... 359/694, 696, 359/697

[56] References Cited

U.S. PATENT DOCUMENTS

| 3,185,061 | 5/1965 | Westphalen | 95/45 |
| 3,817,600 | 6/1974 | Watanabe | 359/693 |
| 4,078,857 | 3/1978 | Kantner | 359/705 |
| 4,669,848 | 6/1987 | Wakabayashi | 354/400 |
| 4,865,434 | 9/1989 | Matsubsita | 359/690 |
| 4,963,907 | 10/1990 | Inoue | 354/222 |
| 5,091,802 | 2/1992 | Imaoka et al. | 359/694 |
| 5,258,799 | 11/1993 | Tanii | 354/402 |
| 5,291,233 | 3/1994 | Hashimoto | 354/400 |
| 5,467,226 | 11/1995 | Watanabe | 359/693 |
| 5,473,404 | 12/1995 | Stephenson | 354/412 |

FOREIGN PATENT DOCUMENTS

| 6-051186 | 2/1994 | Japan . |
| 6-230279 | 8/1994 | Japan . |
| 6-303469 | 10/1994 | Japan . |
| 1509882 | 5/1978 | United Kingdom . |

OTHER PUBLICATIONS

Patent Abstracts of Japan, vol. 95, No. 1, Feb. 28, 1995 (JP-A-6-303469, Oct. 28, 1994).

Patent Abstracts of Japan, vol. 18, No. 281 (P-1744), May 27 1994 (JP-A-6-051186, Feb. 25, 1994).

Patent Abstracts of Japan, vol.18, No. 18, No. 612 (P-1829), Nov. 21,1994 (JP-A-6-230279, Aug. 19, 1994).

*Primary Examiner*—Georgia Y. Epps
*Assistant Examiner*—Ricky Mack
*Attorney, Agent, or Firm*—Fitzpatrick, Cella, Harper & Scinto

[57] ABSTRACT

An objective lens for application to an image apparatus of which the size of the image pickup surface is changeable over between a first mode of a first aspect ratio and a second mode of a second aspect ratio has first optical member for extending the focal length of the objective lens, second optical member for shrinking the focal length of the objective lens, an operating member, and a transmitting mechanism for transmitting the operating force of the operating member to the first optical member under the first mode, and transmitting the operating force to the first and second optical member under the second mode, and by the operation of the operating member, under the first mode, the first optical member is removably insertable into the optical path of the objective lens, and under the second mode, the first and second optical member are removably insertable into the optical path of the objective lens.

6 Claims, 26 Drawing Sheets

OBJECTIVE LENS FOR IMAGE PICKUP APPARATUS WITH SIZE OF IMAGE PICKUP SURFACE CHANGEABLE BETWEEN ASPECT RATIOS

BACKGROUND OF THE INVENTION

1. Field of the Invention

This invention relates to a lens barrel applicable to an image pickup apparatus capable of changing an aspect ratio, and particularly to a lens barrel in which a converting lens unit for changing over the aspect ratio is adapted to be removably provided in a portion of a photo-taking system when, for example, the aspect ratio of an effective image field is reversibly changed from 4:3 to 16:9.

2. Related Background Art

The width to length ratio, the so-called aspect ratio of the effective image pickup surface (image field) of an ordinary television camera, a video camera or the like is 4:3. In contrast with this, recently, the EDTV system having the aspect ratio of image field of 16:9 is being put into practical use as the broadcasting system of the next generation. Therefore, recently, in order to cope with both of the ordinary TV system and the EDTV system of the aspect ratio 16:9, there have been proposed various cameras (image pickup apparatuses) which can selectively use the aspect ratio 16:9 and the aspect ratio 4:3.

For example, in a camera of the image pickup tube type, the deflection area of an electron beam is electrically changed over to thereby change the width to length ratio (the aspect ratio) while keeping the diagonal length of the image field. However, to carry out this system by the use of a solid state image pickup element such as a CCD element, it is necessary to do as follows.

In a camera using a CCD element in which as shown in FIG. 11 of the accompanying drawings, the original aspect ratio of an image pickup surface 111 is 16:9, use is made of the whole area 112 of an image field of an aspect ratio 16:9. On the other hand, when an image field of an aspect ratio 4:3 which is a part area of an image pickup element of this size is to be photographed, as shown in FIG. 10 of the accompanying drawings, the right and left of a photo-taking surface 101 is not used, but only the area 102 of an image field of an aspect ratio 4:3 in the central portion is used.

When the image pickup surface of the image pickup element is thus partly used, the diagonal length of the image field becomes short and therefore, an image obtained by a photo-taking lens cannot be effectively used, and this leads to the disadvantage that the diagonal angle of view becomes narrow or sensitivity is reduced. That is, supposing that only the aspect ratio is simply changed, there axises the problem that the angle of view varies on a monitor.

Heretofore, in a TV camera or the like, use has been made of a system in which an extender is removably inserted into a portion of a photo-taking system (zoom lens) to thereby vary the focal length range of the whole system. In an extender constructed with a view to extend the focal length of the whole system to a longer one, the fact that the aspect ratio is changed, thereby the diagonal image field becomes narrow means that the focal length is apparently further extended. This poses no problem because in a state in which the extender is used, the focal length is in a direction to become longer, but in a state in which the extender is not used, the focal length on the wide angle side shifts to the telephoto side, and this becomes a great problem.

In contrast, in Japanese Laid-Open Patent Application No. 6-230279, there is proposed a method of disposing a lens unit for changing the image size (for example, an image field 103 indicated by dots-and-dash line in FIG. 10) on a turret provided for an extender, and removably inserting a converting lens unit for shrinking the focal length by the rotation of the turret (hereinafter referred to as the "shrinker") into an optical path to thereby avoid the above-noted disadvantage. That is, a lens for preventing any variation in the angle of view even if the aspect ratio varies is prepared on the turret.

In the method proposed in the above-mentioned Japanese Laid-Open Patent Application No. 6-230279, the turret system is used for the changeover of the extender. Therefore, this system is very effective in the case of a large photo-taking lens like, for example, a lens for a studio camera.

However, in a camera system like a portable handy camera wherein a photographer effects photographing carrying the camera on his shoulder, it is usual to manually change over the extender and therefore, the new provision of the turret leads to the arising of the following problems.

(i) The addition of the turret and a rotating mechanism therefor to the photo-taking system greatly increases the weight of the handy camera system.

(ii) Heretofore, in a photo-taking lens for a handy camera, the changeover of the extender has been realized by the vertical or horizontal changeover operation of a changeover lever. To rotate the turret, it is usual to accomplish it by rotating a dial, a knob or the like connected to the turret. By this operation, not only the shrinker but also the extender are changed over, and this gives a feeling of physical disorder to the photographer accustomed to the conventional lens operation, while it takes much time to effect the changeover, and a hindrance comes to arise when a scene quick in movement is to be photographed.

(iii) The changeover mechanism becomes bulky and the area of the track on which the photo-taking lens moves is enlarged and therefore, when the focusing, zooming or iris operation is to be manually performed, an index provided on the circumference of the lens becomes difficult to see and a hindrance arises in the operation.

(iv) After the aspect ratio has once been selected on the camera side during photographing, if the photographer, in spite of having been conscious of only the selection of one-to-one magnification and the extender as before without being conscious of the presence or absence of the shrinker, makes a mistake in the selection, the image field will be eclipsed in some cases. That is, under a mode of an aspect ratio of 16:9, if the shrinker is inserted into the optical path, there will arise the inconvenience that the phenomenon of the light around the image field being eclipsed occurs. Accordingly, a photographer who performs the manual operation must constantly take care of the relation between the aspect ratio and the shrinker even during photographing.

SUMMARY OF THE INVENTION

It is a first object of the present invention to provide a relatively compact lens barrel applicable to a photographing apparatus of which the aspect ratio of the image pickup surface is changeable over.

It is a second object of the present invention to improve the operability of the changeover of a mode in which the aspect ratio varies.

According to a preferred embodiment of the present invention, an objective lens applicable to an image pickup apparatus of which the size of the image pickup surface is changeable over between a first mode of a first aspect ratio and a second mode of a second aspect ratio has first optical means for extending the focal length of said objective lens, second optical means for shrinking the focal length of said objective lens, an operating member, and a transmitting mechanism for transmitting the operating force of said operating member to said first optical means under said first mode, and transmitting the operating force of said operating member to said first and second optical means under said second mode, and by the operation of said operating member, under said first mode, said first optical means is removably insertable into the optical path of said objective lens, and under said second mode, said first and second optical means are removably insertable into the optical path of said objective lens.

Further features of the present invention will become apparent from the following detailed description taken in conjunction with the accompanying drawings.

DESCRIPTION OF THE PREFERRED EMBODIMENTS

Figure 1:
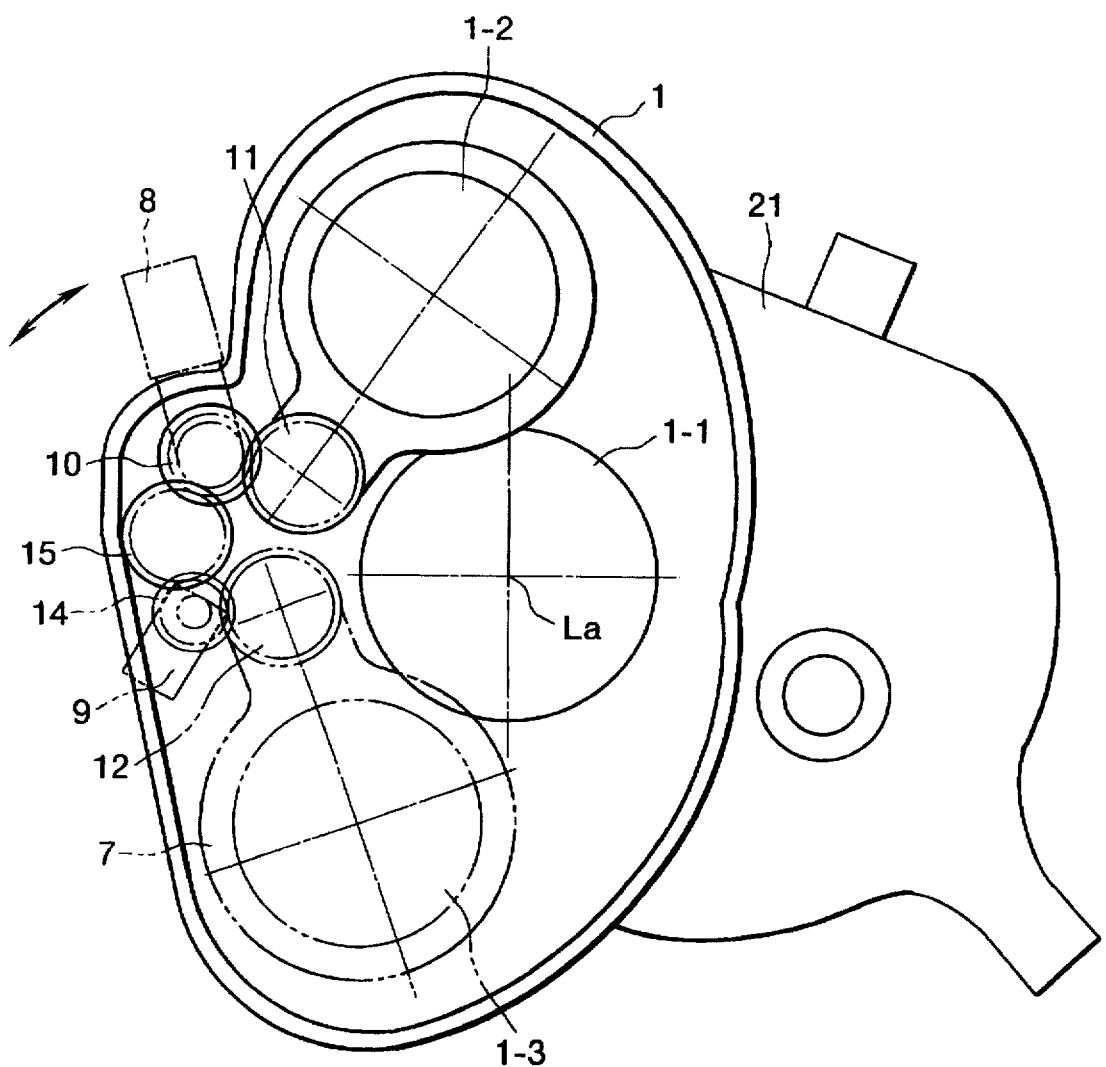
FIG. 1 is a cross-sectional view of a lens barrel according to an embodiment of the present invention.
Figure 2A:
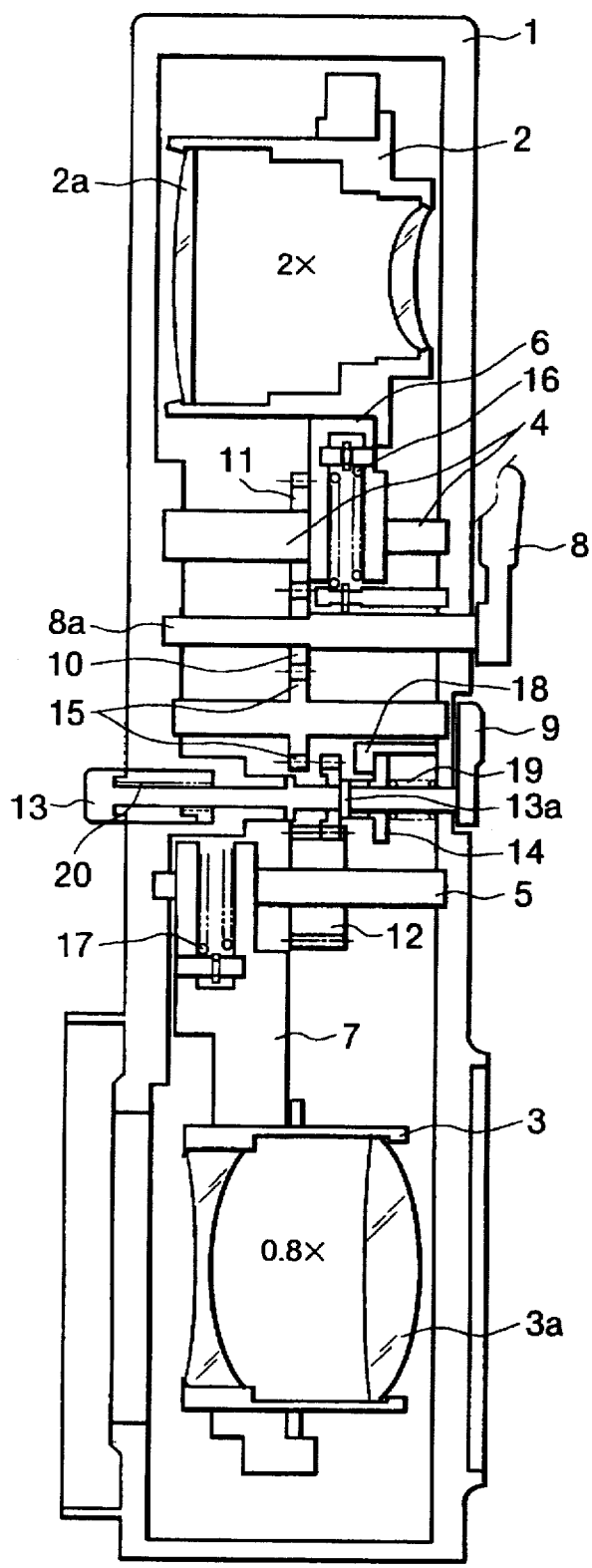
FIGS. 2A, 2B and 2C are a side cross-sectional view and the like of the lens barrel according to an embodiment of the present invention (when the aspect ratio is 16:9).
Figure 2B:
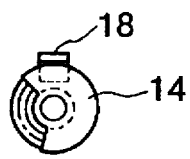
Figure 2C:
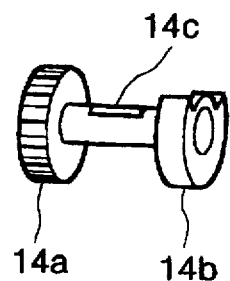
Figure 3:
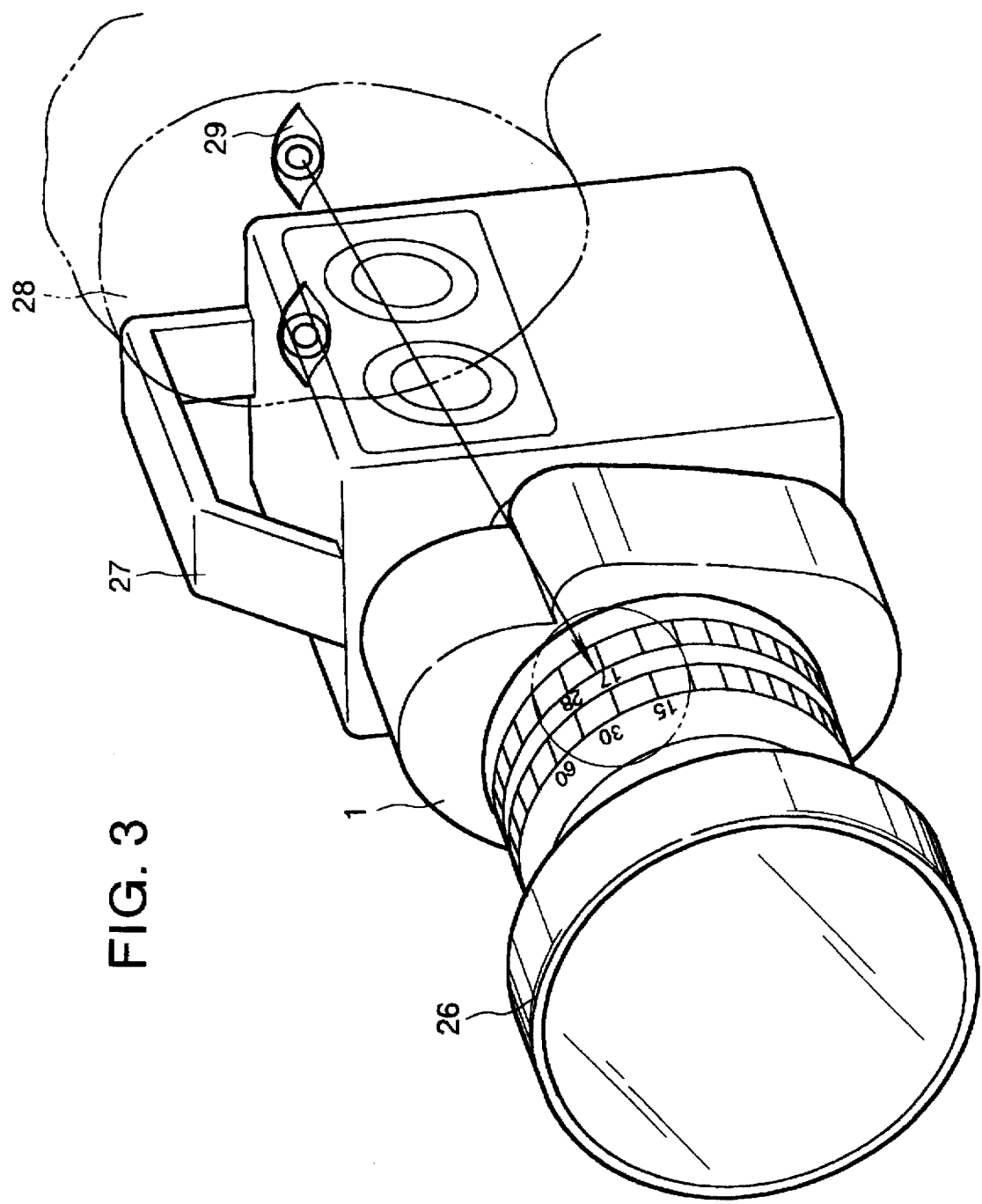
FIG. 3 is a perspective view of the whole of a camera according to an embodiment of the present invention.
Figure 4:
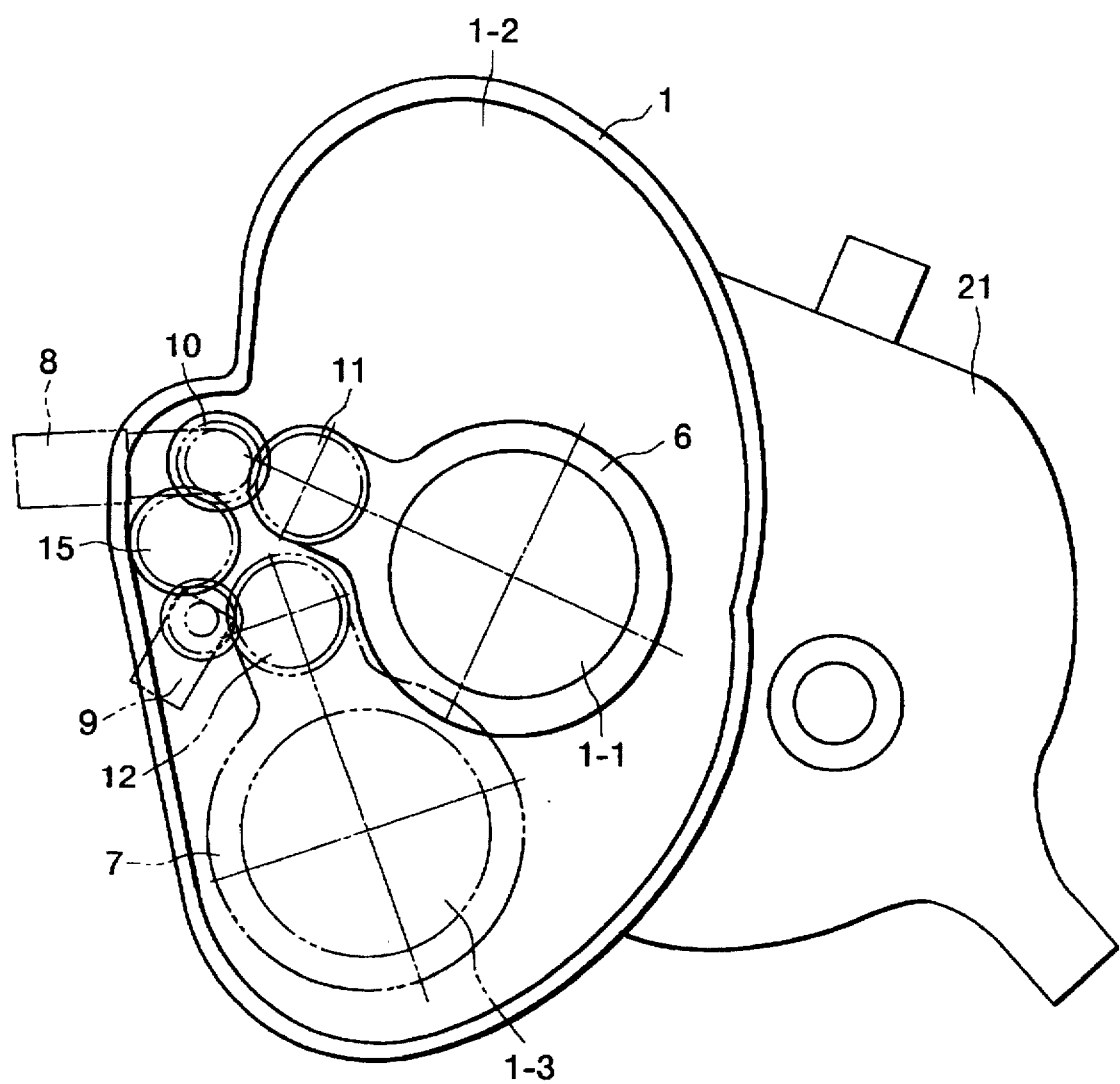
FIG. 4 is a cross-sectional view of the lens barrel according to an embodiment of the present invention.
Figure 5:
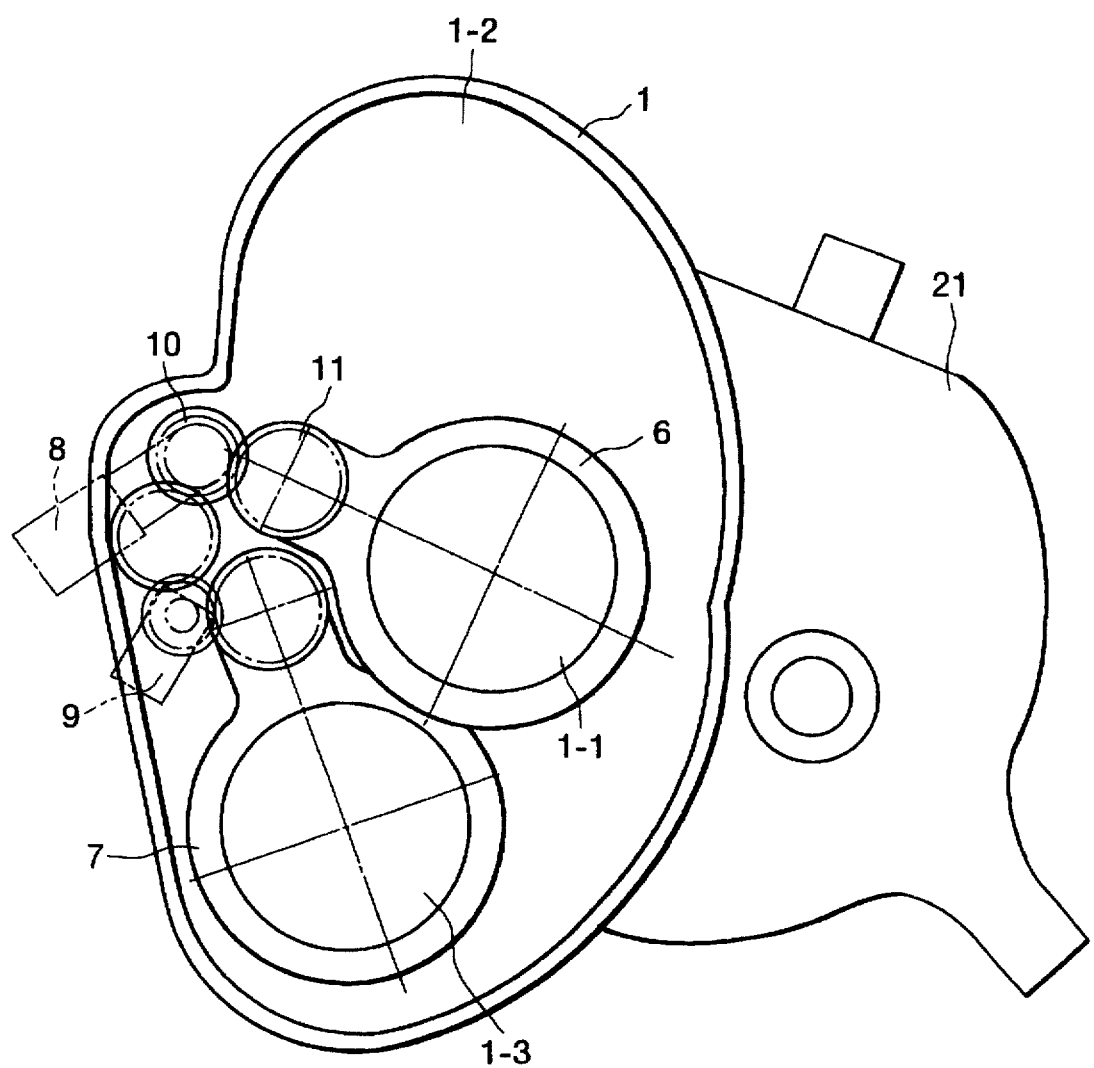
FIG. 5 is a cross-sectional view of the lens barrel according to an embodiment of the present invention.

FIG. 1 is a cross-sectional view of the essential portions of Embodiment 1 of the present invention, FIGS. 2A, 2B and 2C are side views of the essential portions of FIG. 1, FIG. 3 is a pictorial view of the essential portions of an image pickup apparatus according to the present invention, and FIGS. 4 and 5 are illustrations of Embodiment 1 of the present invention.

FIGS. 2A, 2B and 2C show the case of an aspect ratio 16:9 and one-to-one magnification mode (mode A) (both of an extender and a shrinker are absent in an optical path).

FIG. 4 shows the case of an aspect ratio 16:9 and two times mode (mode B) (the extender is inserted in the optical path).

FIG. 5 shows the case of an aspect ratio 4:3 and 2.427 times mode (mode D) (the extender is inserted in the optical path).

Figure 6:
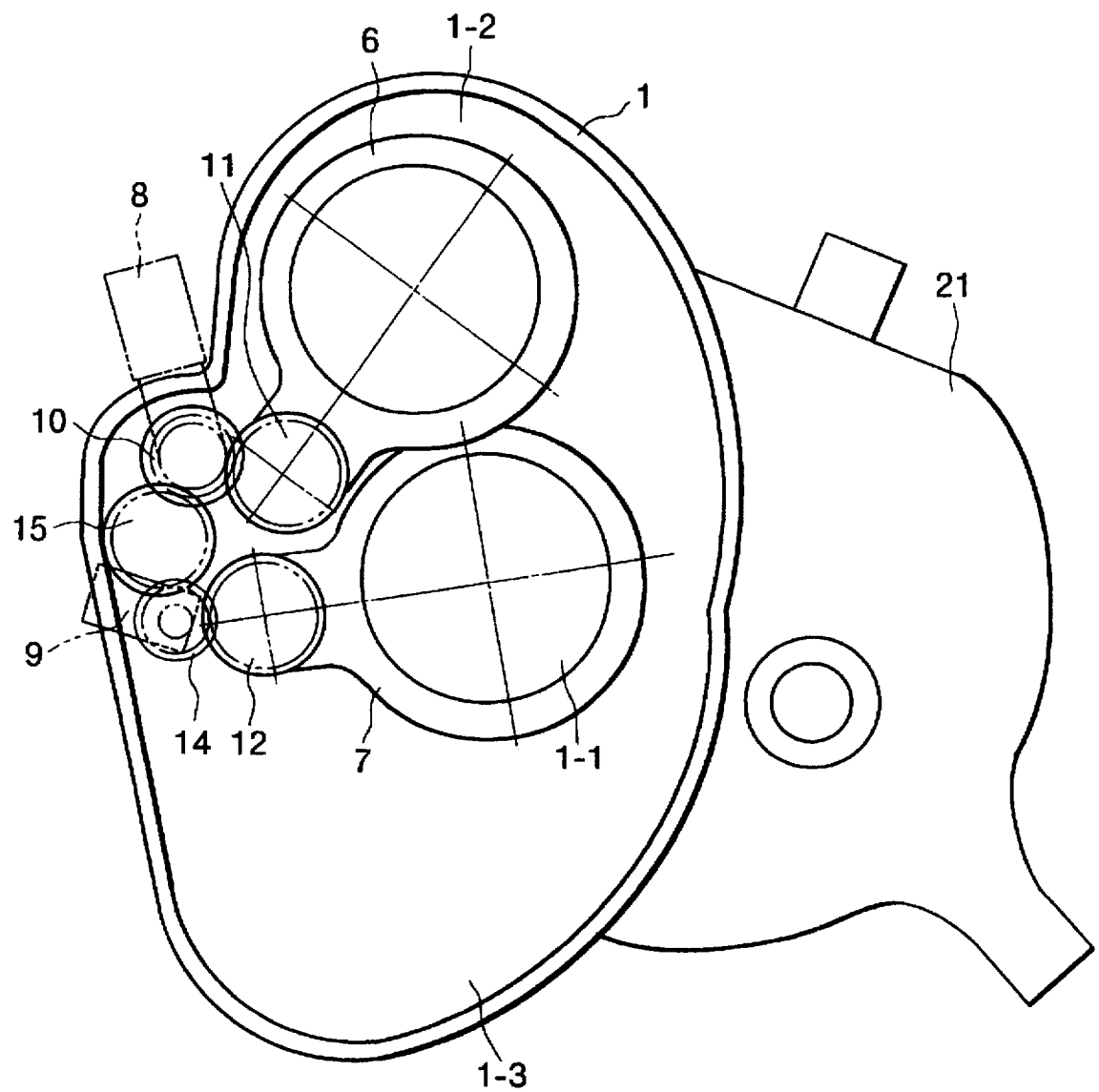
FIG. 6 is a cross-sectional view of the lens barrel according to an embodiment of the present invention.

FIG. 6 shows the case of an aspect ratio 4:3 and one-to-one magnification mode (mode C) (the shrinker is inserted in the optical path).

In the figures, the reference numeral 1 designates a housing containing an interchangeable lens unit therein. The housing 1 contains therein an extender 2a for enlarging the focal length and a shrinker 3a for shrinking the focal length shown in FIG. 7. The housing 1 is provided between a photo-taking lens body 26 having a zoom lens and a camera body 27 (FIG. 3).

In FIG. 3, the reference numeral 28 denotes a photographer, and the reference numeral 29 designates the photographer's eyeballs. In FIG. 1, the reference numeral 1-1 denotes a photo-taking optical path area, and La designates the optical axis thereof. The reference numeral 1-2 denotes an upper retraction area, and the reference numeral 1-3 designates a lower retraction area.

In FIGS. 2A, 2B and 2C, the reference numeral 2 denotes an extender barrel having an extender unit 2a. In these figures, there is shown a case where the extender is comprised of an enlarging system lens having two times the photographing magnification and the focal length range of the whole system is varied to two times toward a longer one (two times mode). The reference numeral 3 designates a shrinker barrel holding a converting lens 3a to be inserted into an optical path correspondingly to the time when an image size (aspect ratio) is converted. In these figures, there is shown a case where the shrinker is comprised of a shrinking system lens having 0.824 times as the photographing magnification. Accordingly, in the mode A and mode C which will be described later, substantially the same angle of view is maintained in spite of the aspect ratio having been varied.

The reference numeral 4 denotes a rotary shaft which corresponds to the center of rotation of the extender barrel 2. The reference numeral 5 designates a rotary shaft which corresponds to the center of rotation of the shrinker barrel 3. The reference numeral 6 denotes a sector which fixes the rotary shaft 4 and the extender barrel 2. The reference numeral 7 designates a sector which fixes the rotary shaft 5 and the shrinker barrel 3. The reference numeral 8 denotes a changeover lever as an operating member for selectively removably inserting the extender barrel 2 and the shrinker barrel 3 into the optical path. The reference character 8a designates a lever shaft on which the changeover lever 8 is mounted. The reference numeral 9 denotes a lever for changing over the mode from a mode of an aspect ratio (second aspect ratio) 4:3 to a mode of an aspect ratio (first aspect mode) 16:9 or conversely. The reference numeral 10 designates a gear fixedly mounted on the lever shaft 8a. The reference numeral 11 denotes a gear constituting an element of extender changeover means. The gear 11 is fixed to the sector 6 and is in meshing engagement with the gear 10. The reference numeral 12 designates a gear as shrinker changeover means. The gear 12 is fixed to the sector 7 and is in meshing engagement with a clutch gear 14.

The clutch gear 14 constitutes an element of connecting means, is slidable in the axial direction of a shaft 13 and is rotatable with the rotation of the lever 9. That is, the clutch gear 14, as shown in FIG. 2C, has a slot 14c in the central portion thereof, and a pin 13a fixed to the shaft 13 is engaged with the slot 14c so that the clutch gear may be slidable only in the axial direction. A gear 14b at the right of the clutch gear has a cut-away portion in a portion thereof and is adapted to be connected and disconnected with a stopper 18 which will be described later. The gear 14a of the clutch gear is normally in meshing engagement with the gear 12 and slides to thereby mesh with both of the gear 12 and an idler gear 15 and connect these two gears together. The idler gear 15 is normally in meshing engagement with the gear 10. The reference numeral 16 denotes a spring resiliently holding the extender barrel 2 and the sector 6. The reference numeral 17 designates a spring resiliently holding the shrinker barrel 3 and the sector 7. The reference numeral 18 denotes a stopper as connection releasing means provided in the housing 1. The stopper 18 regulates the meshing engagement between the gear 14 and the idler gear 15 and the releasing thereof. The reference numeral 19 designates a spring biasing the clutch gear 14 leftwardly as viewed in FIG. 2A. The reference numeral 20 denotes a spring biasing the shaft 13 leftwardly as viewed in FIG. 2A. The reference numeral 21 (FIG. 1) designates a driving grip provided sideways of the photo-taking lens 26.

In the present embodiment, the conversion of the aspect ratio and the enlargement (magnification) of the zoom range are coped with in a state in which one of the extender and the shrinker is removably inserted into a portion of the zoom lens (photo-taking system) 26, for example, the optical path of a relay lens or in a state in which none of the extender and the shrinker is inserted. The construction of the used states of the extender and the shrinker in each mode at this time is as shown in Table 1 below.

TABLE 1

| Aspect ratio | Enlargement magnification of zoom range | Lens unit disposed on the optical axis (area 1-1) of a portion (relay lens) of photo-taking system | Area 1-2 | Area 1-3 | Mode symbol | Corresponding figure |
|---|---|---|---|---|---|---|
| 16:9 | one-to-one | none | extender 2 | Shrinker 3 | mode A | FIG. 1 |
| 16:9 | two times | extender 2 | none | shrinker 3 | mode B | FIG. 4 |
| 4:3 | one-to-one (0.824 time at 16:9) | shrinker 3 | extender 2 | none | mode C | FIG. 6 (FIG. 7) |
| 4:3 | 2.427 times | extender 2 | none | shrinker 3 | mode D | FIG. 5 (FIG. 7) |

As shown in Table 1, there are four modes (photographing conditions) for two aspect ratios desired by the photographer. Actually, there are three kinds of disposition, i.e., a case where the extender and the shrinker are absent in the optical path (mode A), a case where the extender is disposed in the optical path (mode B, mode D), and a case where the shrinker is disposed in the optical path (mode C). As described with respect to the prior art, this is from the judgment that from the situation of use of the extender, the correction in a direction to extend the focal length is unnecessary. Accordingly, even when the same extender of two times is used, in the case of a mode of use of an extender of an aspect ratio 4:3, from

2/0.824=2.427, the focal length of the whole photo-taking system becomes a focal length of apparently 2.427 times.

Operation will now be described.

FIGS. 1, 2A, 2B and 2C show a case where the aspect ratio is 16:9 and the whole system not using the extender is in mode A of one-to-one magnification (aspect ratio 16:9, one-to-one magnification mode). In this case, as shown in Table 1, the extender barrel 2 and the shrinker barrel 3 are both disposed at positions retracted from the optical axis La.

When in this state, the changeover lever 8 is operated, the lever shaft 8a on which the changeover lever 8 is mounted is rotated and the gear 10 is also rotated. Since the gear 10 is in meshing engagement with the gear 11, the gear 11 is rotated to thereby rotate the sector 6. Thereby, as shown in FIG. 4, the extender barrel 2 is disposed on the optical axis La. At this time, the mode becomes mode B (aspect ratio 16:9, two times mode) in which the aspect ratio is 16:9 and the focal length of the whole system has been enlarged to two times.

Also, when conversely, the changeover lever 8 is returned, the same member is reversely rotated and the extender barrel 2 retracts from the optical axis La. In the case of this mode of the aspect ratio 16:9, the gear 14a of the clutch gear and the gear 15 provided on the shrinker barrel 3 side do not touch each other at all. Accordingly, the shrinker barrel 3 remains retracted from the optical path. At this time, the mode returns to the mode (aspect ratio 16:9, one-to-one magnification mode) in which the aspect ratio is 16:9 and the focal length range of the whole system is one-to-one magnification free of any variation.

Thus, the present embodiment adopts a construction in which when the mode of the aspect ratio (first aspect ratio)

16:9 is selected, the shrinker is inhibited from entering and only the extender barrel 2 can be changed over by the changeover lever 8.

Accordingly, under this mode, any reduction in the quantity of light around the image field is prevented by the insertion of the shrinker into the optical path.

Description will now be made of the case of a mode of the aspect ratio (second aspect ratio) 4:3.

Description will first be made of the changeover from the mode A to the mode C when the aspect ratio is changed on the camera body side with the photo-taking system being in one-to-one magnification state.

For the changeover from the mode A shown in FIGS. 1, 2A, 2B and 2C to the mode C shown in FIG. 6, the mode changeover lever 9 is rotated. Thereupon, immediately before the rotating operation of the lever 9 is terminated, the clutch gear 14 so far regulated by the stopper 18 comes out of engagement with the stopper 18 and is moved to the left of the shaft 13 as viewed in FIG. 2A by the biasing force of the spring 19, and the gear 14a of the clutch gear comes into meshing engagement with the gear 15. Thereby, the extender barrel 2 and the shrinker barrel 3 are connected together. The rotation of the lever 9 is transmitted to the gear 12 by the gear 14a of the clutch gear and the center of the optical axis of the shrinker barrel 3 is moved to a position which coincides with the center of the optical axis La, through the sector 7. Thereby, the mounting of the shrinker 2a onto the optical axis is effected and the changeover from the mode A to the mode C is effected.

In this state (mode C), as previously described, the operating force of the operating lever 8 is always transmitted to the shrinker 3a through a connecting mechanism. That is, since the gear 14a of the clutch gear is in meshing engagement with the gear 12, the shrinker 3a becomes operatively associated with the extender by the operating lever 8 being rotatively operated, and the changeover from the mode C to the mode D becomes possible. Of course, the changeover from the mode D to the mode C can also be accomplished by the operation of the operating lever 8.

Figure 7:
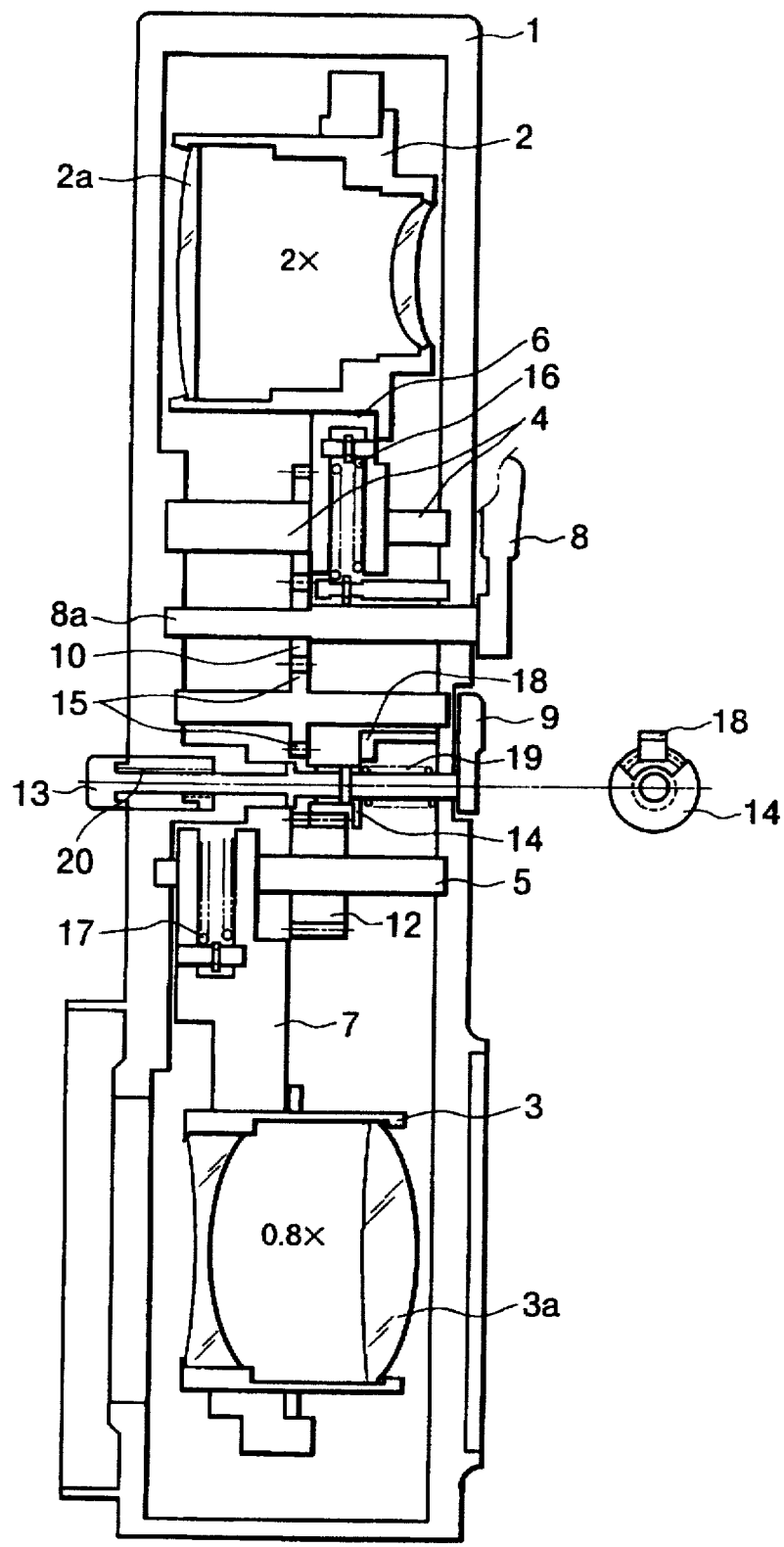
FIG. 7 is a side cross-sectional view of the lens barrel according to an embodiment of the present invention (when the aspect ratio is 4:3).

Description will now be made of the changeover from the mode C to the mode A in which nothing is inserted into the optical path and a mechanism therefor. For the changeover from the mode C shown in FIG. 6 to the mode A, the shaft 13 shown in FIG. 7 is pressed and moved rightwardly as viewed in the figure by fingers, while the lever 9 fixed to the same shaft is rotated in the original direction. By the shaft 13 being deviated, the clutch gear 14 is also moved rightwardly as viewed in the figure against the force of the spring 19 and comes out of meshing engagement with the idler gear 15. Thereafter, the lever 9 is rotated to its original position, whereby the gear 14a of the clutch gear is normally in meshing engagement with the gear 12 and therefore, through the sector 7, the shrinker barrel 3 comes to the area 1-3 in which it was originally positioned. On the other hand, the gear 14b is again caught by the stopper 18 due to its axial movement and rotation, and by releasing the fingers, the shaft 13 is returned to its original position by the spring 20 after the rotation of the lever 9, and stays in a position shown in FIGS. 2A to 2C. Thereby, the changeover of the aspect ratio from the mode C to the mode A is effected.

What has been described above is the changeover of the aspect ratio. By this and the above-described extender changeover method, the changeover of all modes is made possible.

The mutual changeover between the mode B and the mode D is effected by electrical processing in the camera body with the extender 2a disposed in the optical path.

In the present embodiment, as described above, the changeover to each mode is made easy by the construction in which:

provision is made of the connecting means and connection releasing means which makes the operation of only changing over the shrinker and the extender by only one changeover operation of the operating means in accordance with the aspect ratio and which can be selected by the photographer;

provision is made of the connecting means and connection releasing means which can effect the extender changeover operation and the connecting lens unit changeover operation at a time by the converting lens unit changeover operation;

the center of the rotational movement during the changeover of the extender and the converting lens unit is divided and the retraction location of the lens unit from the optical axis is secured at a position whereat the photographer can confirm the index and a numerical value corresponding thereto;

some of the gears change their positions in parallelism to the rotary shaft to thereby come out of meshing engagement and effect connection and the releasing of the connection; and provision is made of the shaft and the gear movable in the axial direction and transmitting only the rotational force and weighted by the spring and having a convex portion formed on a portion outside the rotary shaft, and the convex portion interferes with the stopper by the angle of rotation of the gear to thereby change the position of the gear.

Figure 8:
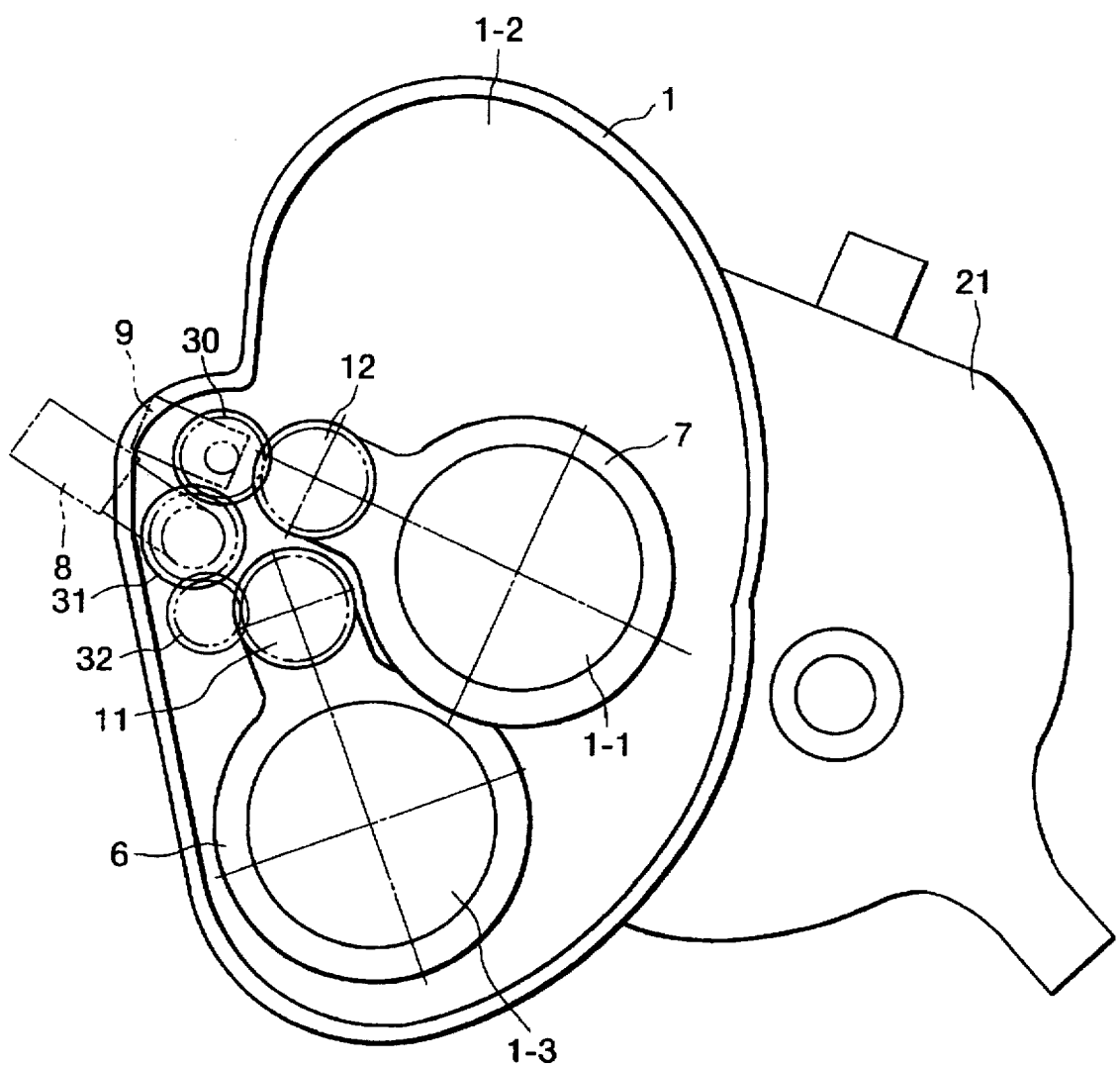
FIG. 8 is a cross-sectional view of a lens barrel according to an embodiment of the present invention.

FIG. 8 is a schematic view of the essential portions of Embodiment 2 of the present invention. This embodiment, as compared with Embodiment 1, is one in which the disposition of the barrels is vertically reversed (in this state, one-to-one magnification of an aspect ratio 4:3). That is, design is made such that the extender barrel 2 is retracted downwardly (the area 1-3) and the shrinker barrel 3 is retracted upwardly (the area 1-2). The reference numerals in this figure designate the same parts as those in Embodiment 1.

The reference numeral 30 designates a gear corresponding to the gear 14 in Embodiment 1 and movable in the thrust direction, the reference numeral 31 denotes a gear corresponding to the gear 10 and fixed to the extender changeover lever, and the reference numeral 32 designates an idler gear which is normally in meshing engagement with the gear 11 and the gear 31. The operation and the movement of the barrels are the same as those in Embodiment 1, and the internal mechanism is also the same as that in Embodiment 1 except the position of the idler and therefore, detailed description of the operation need not be made.

As described above, the disposition of the barrels can be done anyway, depending on the positional relation of the idler gear.

Figure 9:
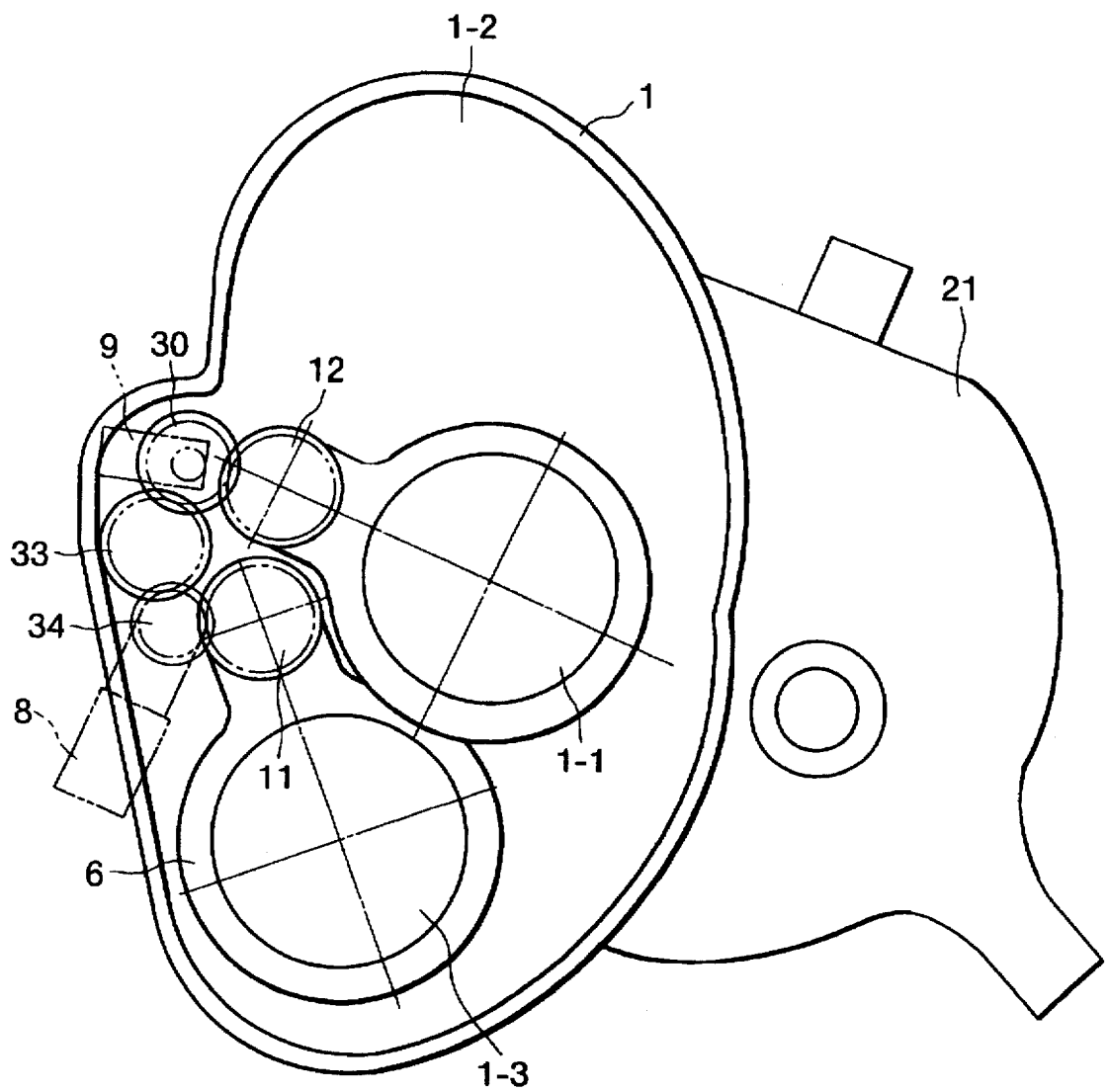
FIG. 9 is a cross-sectional view of a lens barrel according to an embodiment of the present invention.
Figure 10:
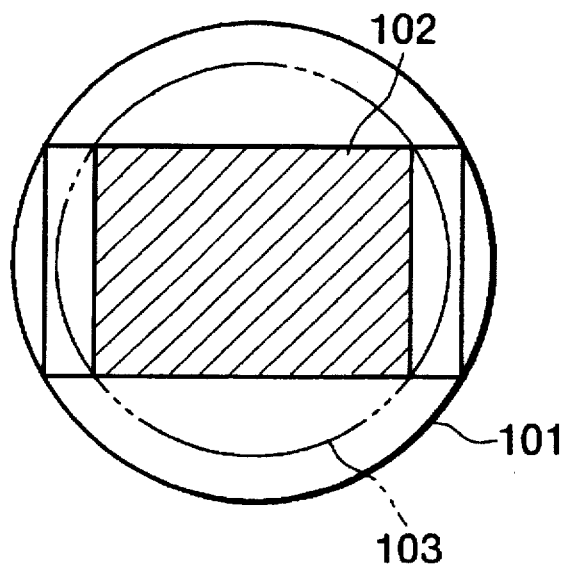
FIG. 10 shows an image circle at an aspect ratio of 4:3.
Figure 11:
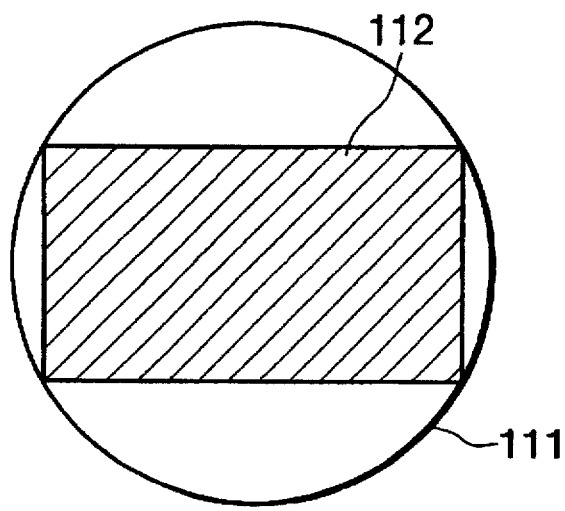
FIG. 11 shows an image circle at an aspect ratio of 16:9.

FIG. 9 is a schematic view of the essential portions of Embodiment 3 of the present invention. This embodiment, as compared with Embodiment 2 of FIG. 8, is one in which the operating system is vertically reversed (in this state, one-to-one magnification of an aspect ratio 4:3). The reference numerals in this embodiment designates the same parts as those in Embodiments 1 and 2. The reference numeral 33 denotes an idler gear corresponding to the idler gear 15 in Embodiment 1, and the reference numeral 34 designates a gear corresponding to the gear 10 and fixed to the extender changeover lever. The only difference of this embodiment from Embodiment 2 is that the changeover direction of the extender is converse, and the operation of this embodiment is similar to that of Embodiment 2 and therefore need not be described. As described above, the direction of operation can be anyway, depending on the positional relation of the idler gear.

In Embodiment 1, the magnification of the extender has been described with respect to the case of two times, but may be any other magnification. Also, when for a camera having an image pickup element of which the aspect ratio of the image pickup surface is 4:3, an image field of an aspect ratio 16:9 which is an area thereof is to be photographed, a vertical portion of the image field is not used, but the area of 16:9 of the central portion may be used, or in such case, the magnification of the shrinker may be changed to 0.917 time and may be made to correspond thereto. Also, even when the aspect ratio differs, a shrinker magnification corresponding thereto may likewise be adopted and may be made to correspond thereto.

According to the present invention, as described above, in the photo-taking system having the converting lens (shrinker) for the changeover of the aspect ratio and the extender, there can be achieved an image pickup apparatus capable of changing over the aspect ratio in which a driving mechanism for effecting the removable insertion of both lenses into the optical path is appropriately set, whereby irrespective of the use or non-use of the shrinker, by only the operation of removably inserting the extender into the optical path, photographing can be effected easily at one-to-one magnification or a different magnification (focal length range).

Particularly, the present invention can cope with a camera with the aspect ratio changeover function which enables the quick extender operation by the operation of the changeover lever similar to that in the prior art to be performed without giving a feeling of physical disorder to a photographer accustomed to the photographing operation of a zoom lens for the conventional handy camera with an extender.

Also, the photographer, after he has once selected an aspect ratio, can be conscious of only the selection of one-to-one magnification and the extender as before and therefore, these makes it unnecessary for the photographer to newly learn to use the new function of changing over the aspect ratio, and can effectively prevent the eclipse of the photographed image which is a mistake absolutely unallowable in photographing.

Also, it becomes possible to minimize the area of the movement locus of the lens and very much simplify the entire changeover mechanism and therefore, as compared with the turret type according to the prior art, it is possible to make the entire photographing system light in weight. At the same time, the shape made compact as compared with the turret type does not spoil the visual confirmability of a scale for operation, index lines, etc. disposed on the circumference of the lens.

An embodiment improved over the above-described embodiments will now be described with reference to FIGS. 12 to 17. The improved points are that the clutch gear 14 and the stopper 18 in the above-described embodiments are eliminated and that the shaft 5 is improved to thereby improve the operability. The members designated by the other reference numerals perform the same functions and therefore need not be described in detail.

The reference character 5a designates a small gear as an element of converting lens changeover means. The small gear 5a is fixed to the rotary shaft 5.

The reference character 5b denotes a large gear as an element of the converting lens changeover means. The large gear 5b is fixed to the rotary shaft 5. The reference numeral 13 designates a shaft gear constituting an element of connecting means and fixed to the lever 9. A large gear 13a and a small gear 13b are secured to the shaft 13c of the shaft gear 13. The small gear 5a, the large gear 5b and the shaft gear 13 together constitute an element of a speed reducing mechanism. The gear 13a, as shown in FIG. 13B, has a cut-away portion in a portion thereof, and this cut-away portion is in such relationship as not to mesh with the gear 15 in the case of a mode of 16:9.

The shaft 13c is slidable in the axial direction thereof and is rotatable with the rotation of the lever 9. The shaft 13c is such that by its sliding, the large gear 13a meshes with the idler gear 15 and the small gear 5a (FIGS. 13A and 13B) or the small gear 13b meshes with the large gear 5b (FIG. 14). The idler gear 15 is normally in meshing engagement with the gear 10.

The construction of the used states of the extender and the shrinker in each mode at this time is as follows when shown analogically to the table shown below.

TABLE 2

Figure 12:
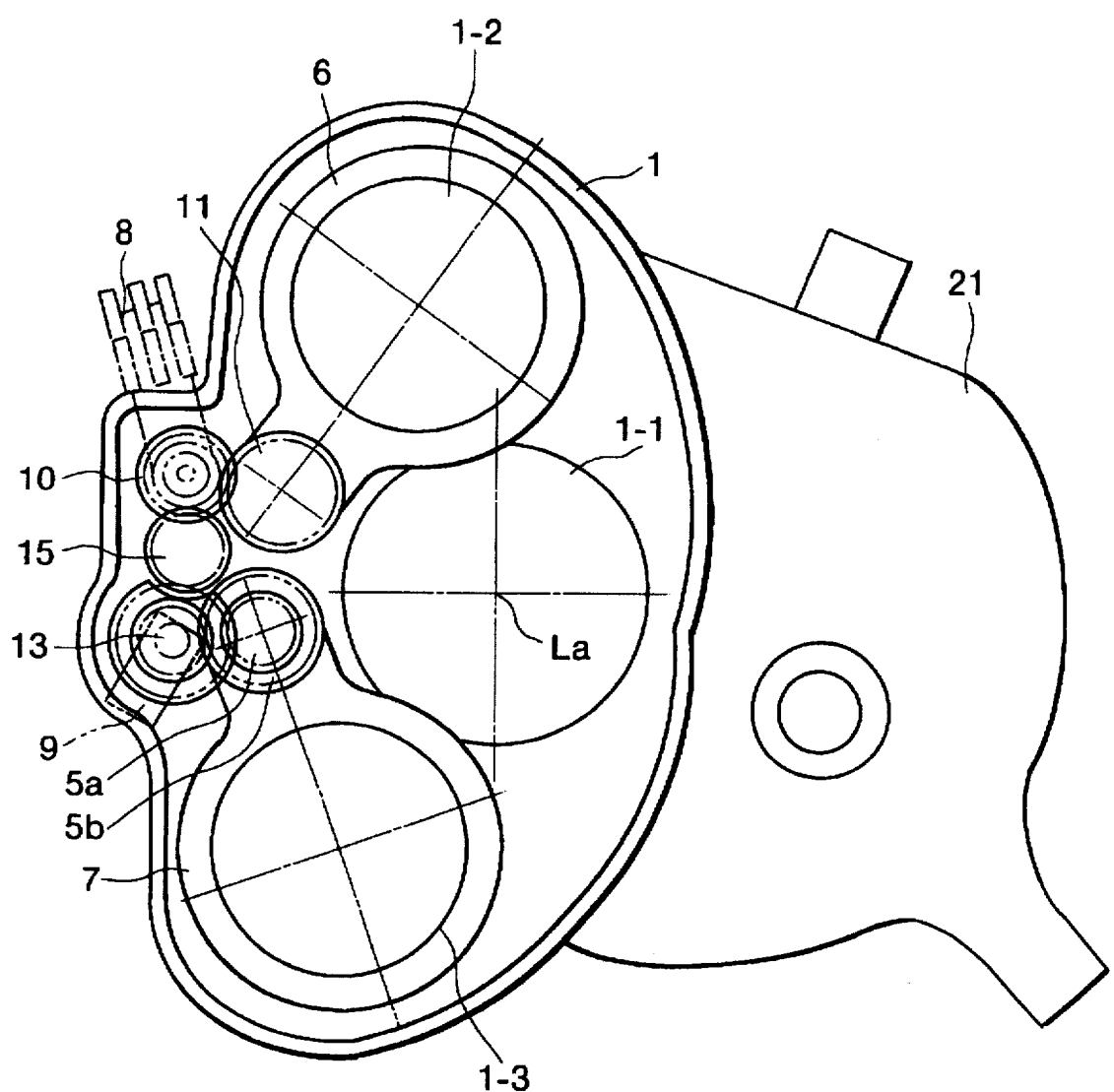
FIG. 12 is a cross-sectional view of a lens barrel according to another embodiment of the present invention.
Figure 13A:
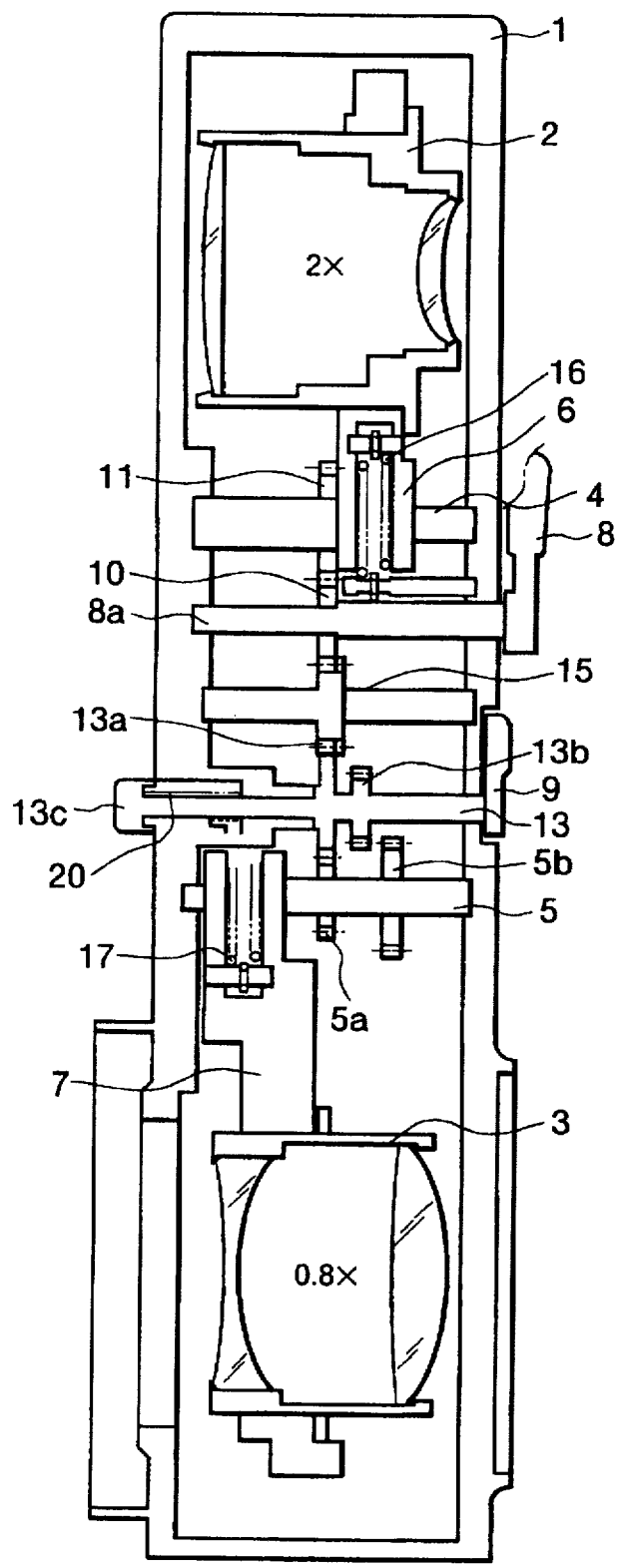
FIGS. 13A and 13B are side cross-sectional views of the lens barrel according to another embodiment of the present invention.
Figure 13B:
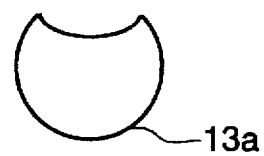
Figure 14:
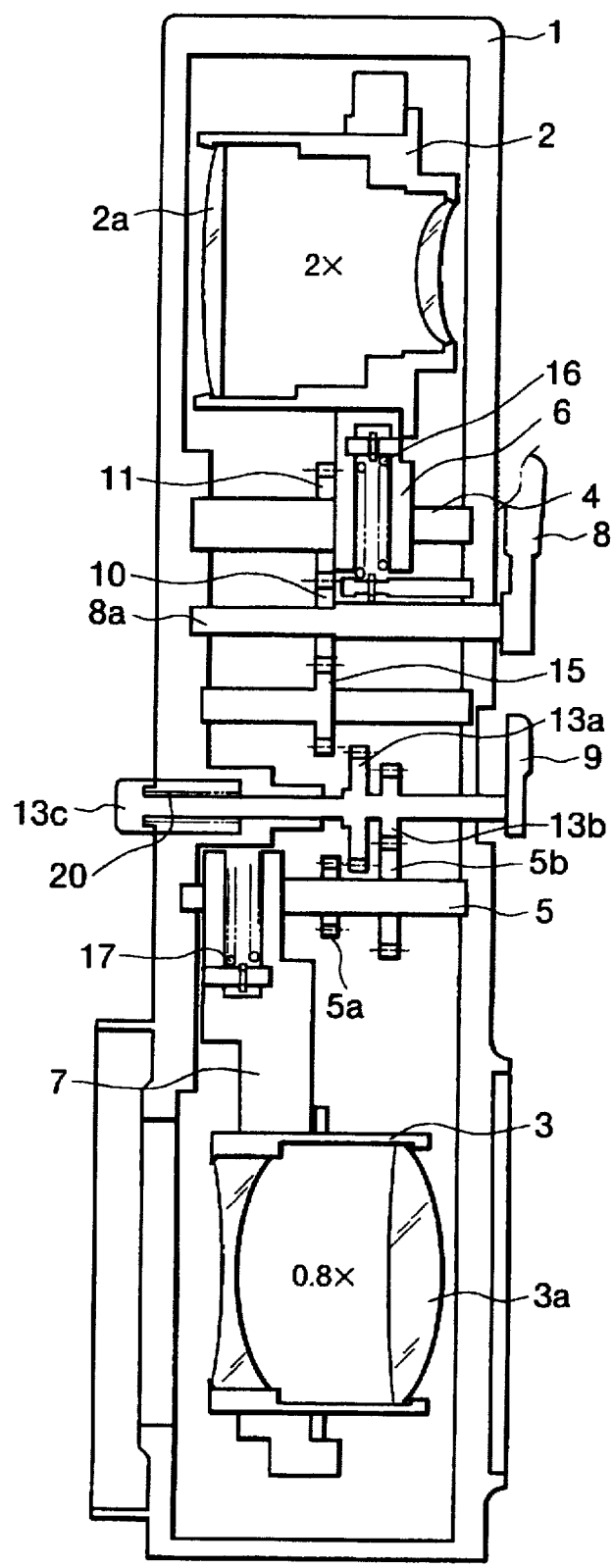
FIG. 14 is a side cross-sectional view of a lens barrel according to another embodiment of the present invention.
Figure 15:
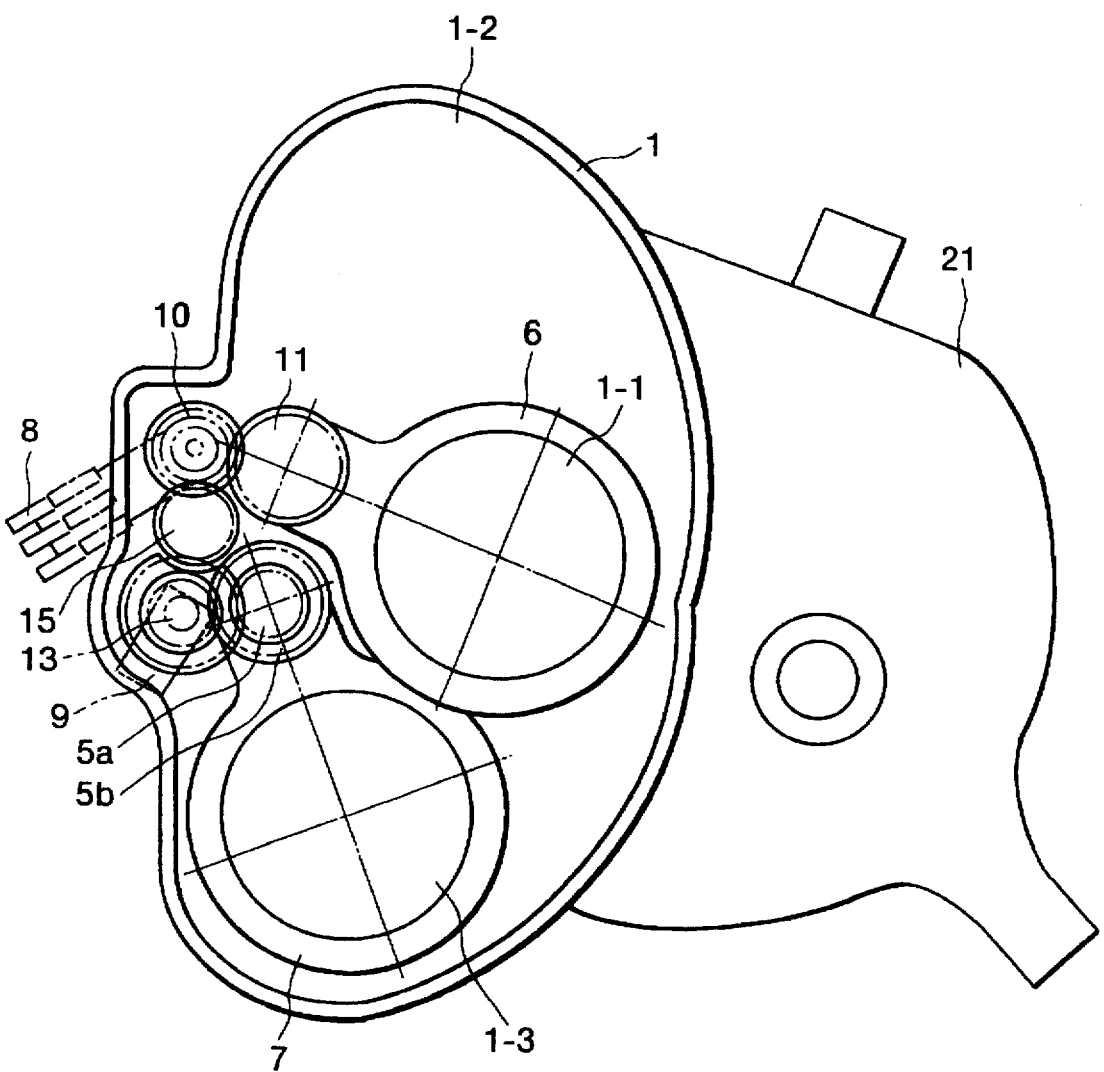
FIG. 15 is a cross-sectional view of the lens barrel according to another embodiment of the present invention.
Figure 16:
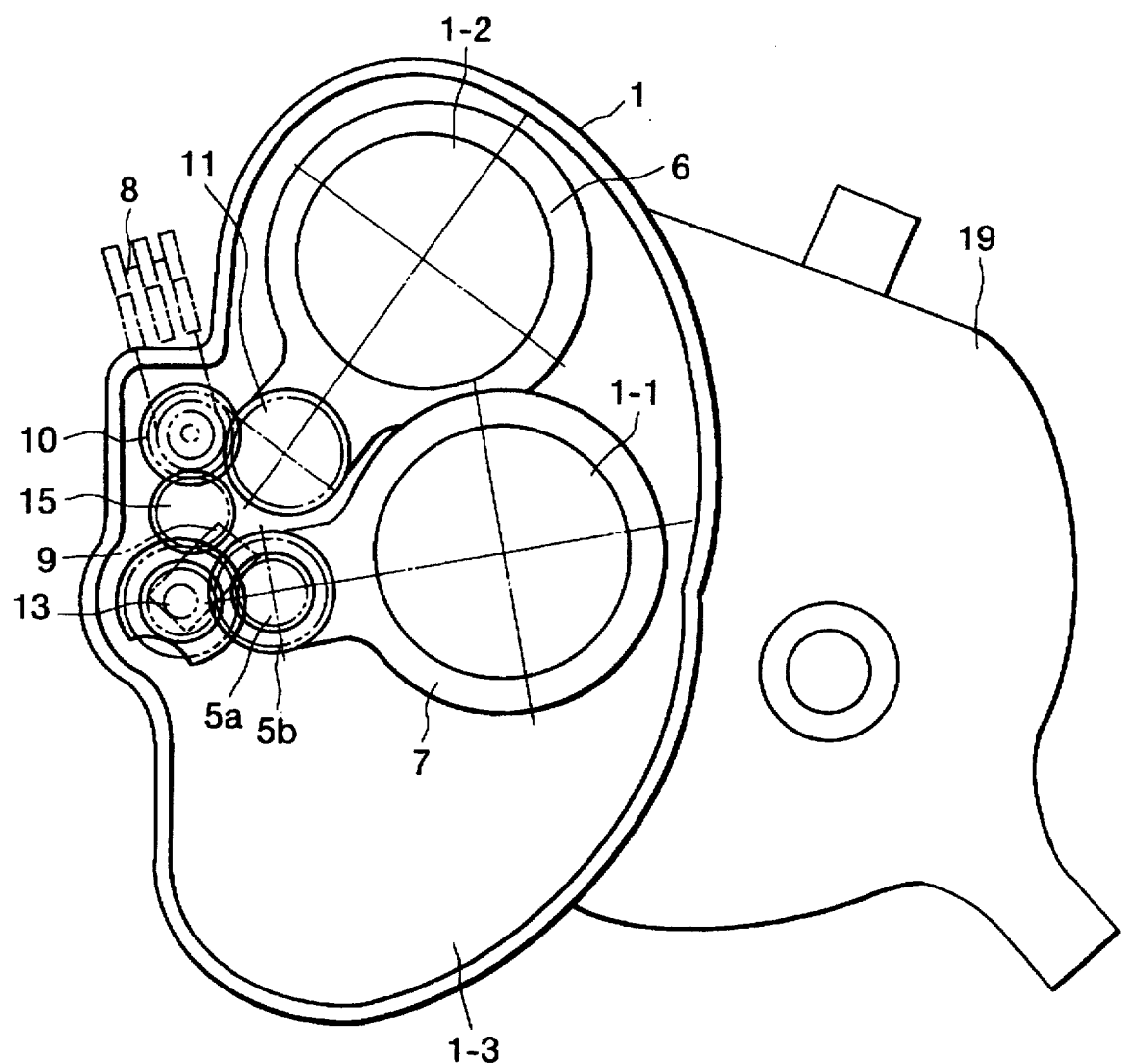
FIG. 16 is a cross-sectional view of a lens barrel according to another embodiment of the present invention.
Figure 17:
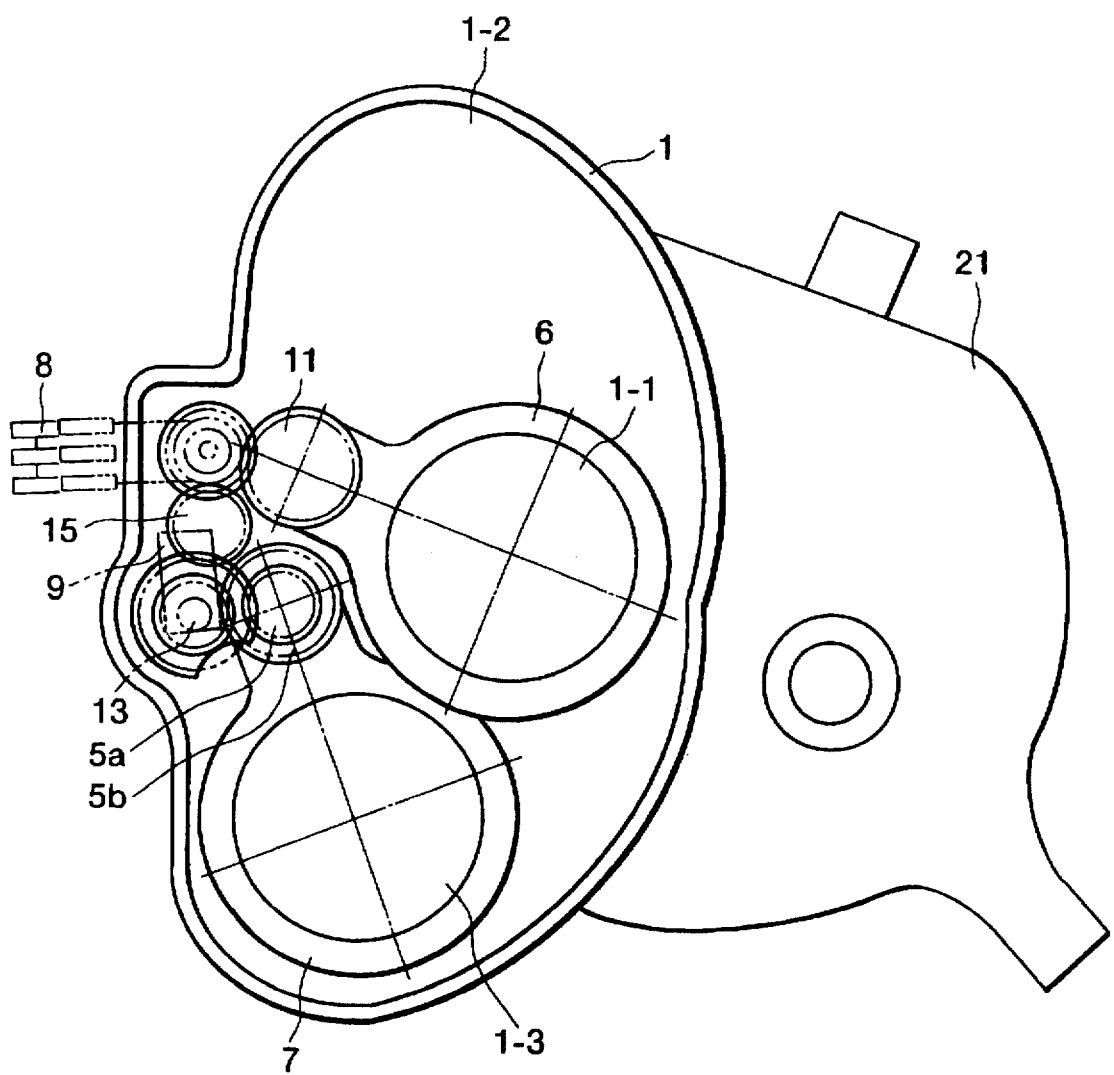
FIG. 17 is a cross-sectional view of the lens barrel according to another embodiment of the present invention.

| Aspect ratio | Enlargement magnification of zoom range | Lens unit disposed on the optical axis (area 1-1) of a portion (relay lens) of photo-taking system | Area 1-2 | Area 1-3 | Mode symbol | Corresponding figure |
|---|---|---|---|---|---|---|
| 16:9 | one-to-one | none | extender 2 | shrinker 3 | mode A | FIG. 12 FIG. 14 |
| 16:9 | two times | extender 2 | none | shrinker 3 | mode B | FIG. 15 |
| 4:3 | one-to-one (0.824 time at 16:9) | shrinker 3 | extender 2 | none | mode C | FIGS. 13A, 13B FIG. 16 |
| 4:3 | 2.427 times | extender 2 | none | shrinker 3 | mode D | FIG. 17 |

Under such a construction, when the aspect ratio is 16:9, the gear 13a and the gear 15 are not in meshing engagement with each other and therefore, by the operating lever 8 being rotated, only the extender 2 of two times becomes removably insertable onto the optical axis La (FIGS. 12, 13A, 13B and 15). That is, the changeover of the mode A and the mode B becomes possible by the operation of the operating lever 8.

Description will now be made of the operation of changing over the mode from the mode of the aspect ratio 16:9 to the mode of the aspect ratio 4:3. The changeover from the mode A (the converting lens is absent on the optical axis La) to the mode C is effected as follows.

The shaft 13 is first pressed and slidden by fingers against the spring 20 to thereby bring the small gear 13a into meshing engagement with the gear 5b. Subsequently, the lever 9 is rotated to thereby insert the shrinker 3 into the optical path (the mode C). By releasing the fingers, the shaft slides leftwardly and now the gear 13a comes into meshing engagement with the gear 15 and thus, the rotative operation of the operating lever 8 is transmitted to the shrinker 3.

That is, the rotation of the operating lever 8 is transmitted to the gears 15, 13a and 5a, and the extender and the shrinker are always operatively associated with each other, and the changeover from the mode C to the mode D or the converse mode changeover becomes possible.

Conversely, for the changeover from the mode of the aspect ratio 4:3 to the mode of the aspect ratio 16:9, the mode is first set to the mode C, whereafter the shaft 13c is pressed by fingers and the gear 13b is brought into meshing engagement with the gear 5b, whereafter the lever 8 is rotated to its original position, whereupon the shrinker is retracted from the optical axis La. By releasing the fingers, the original state is restored.

In the present embodiment, the diameter of the gear 13b of the gears meshing with each other during the changeover of the aspect ratio is made smaller than the diameter of the gear 5a, whereby the operating force required to removably insert the shrinker can be made small and the operability is successfully improved.

An embodiment of another form will now be described with reference to FIGS. 18 to 22.

Figure 18:
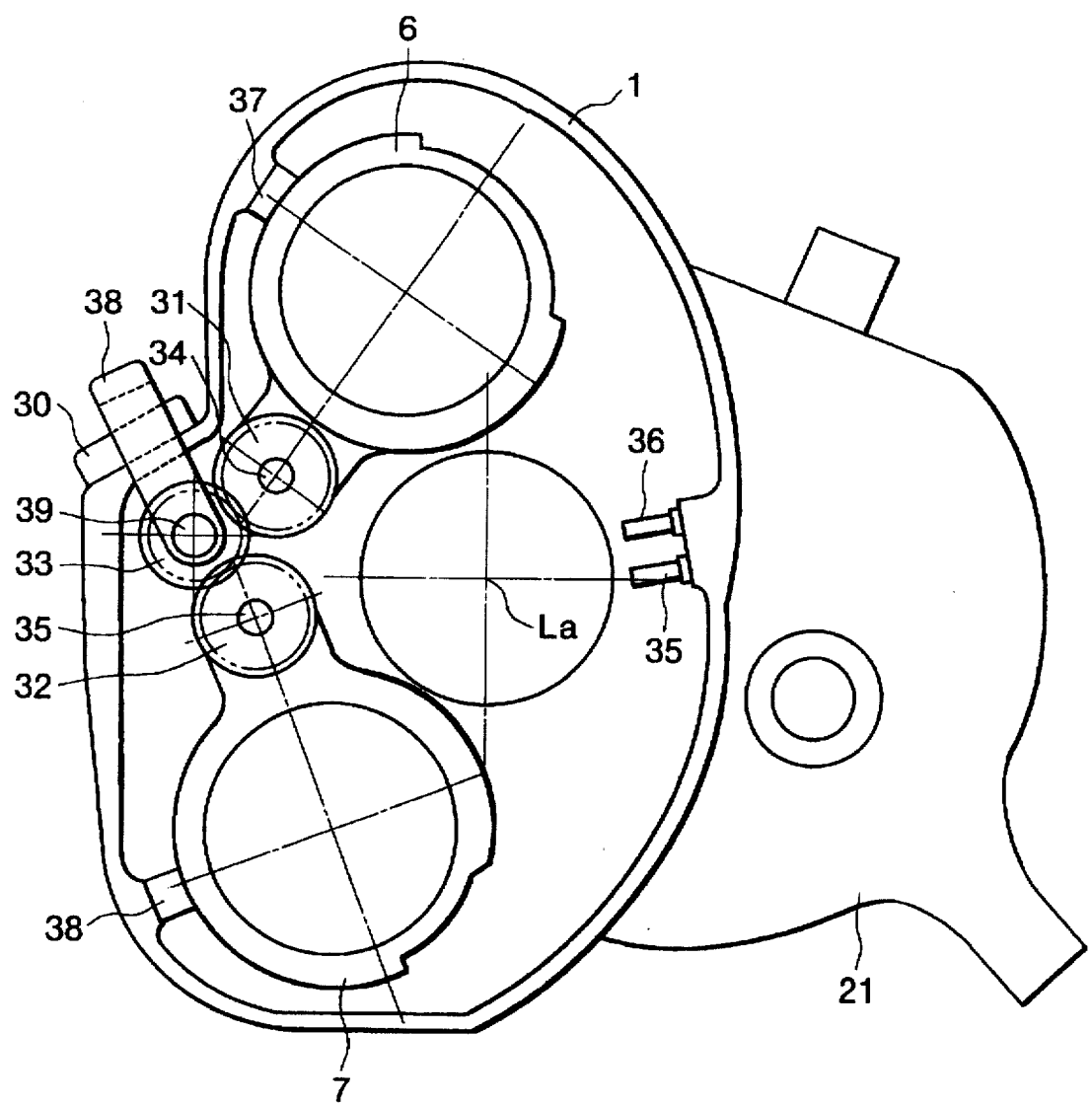
FIG. 18 is a cross-sectional view of a lens barrel according to still another embodiment of the present invention.
Figure 19A:
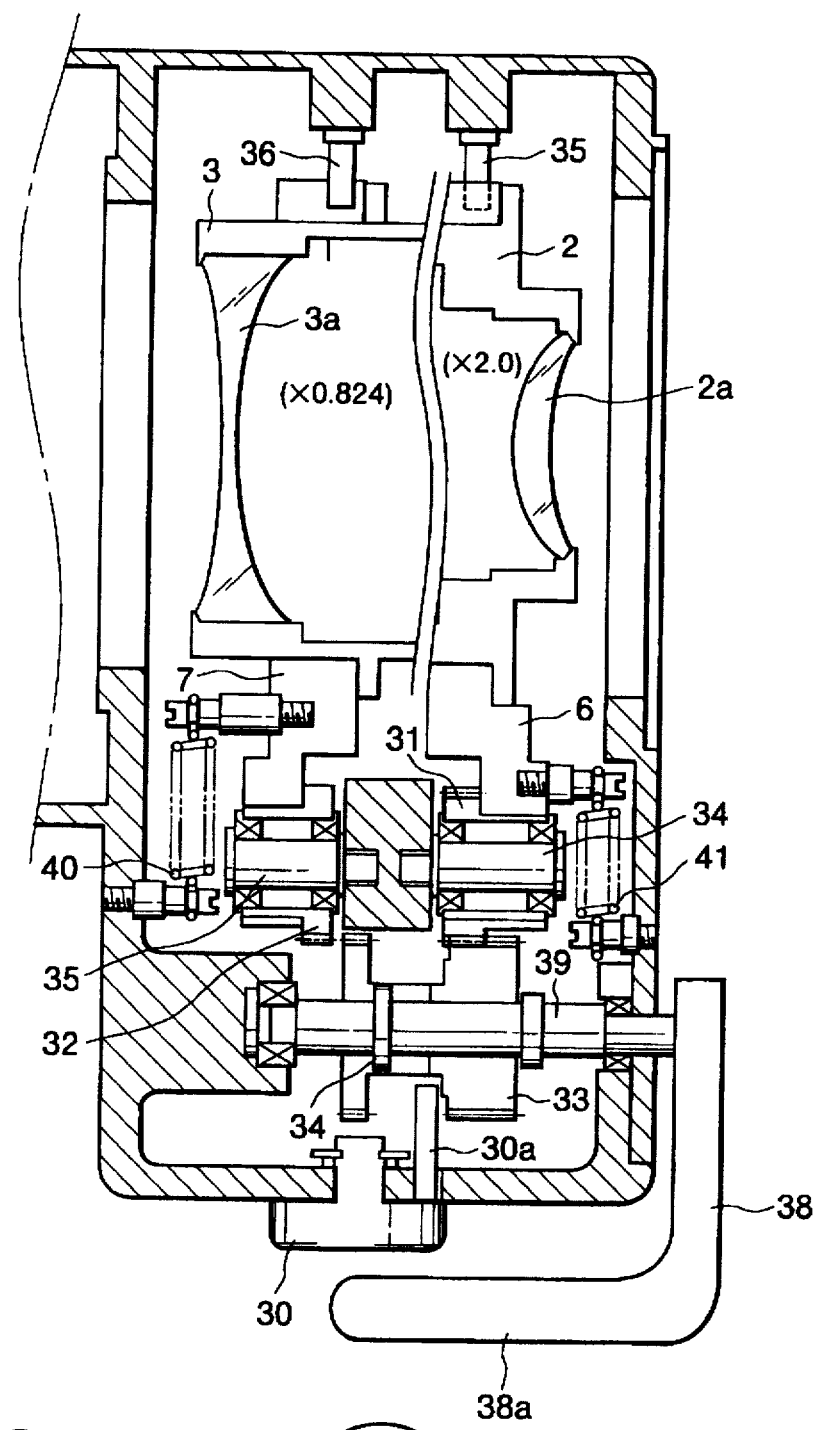
FIGS. 19A and 19B are side cross-sectional views of the lens barrel according to still another embodiment of the present invention.
Figure 19B:
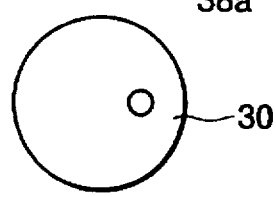

FIG. 18 is a cross-sectional view of the essential portions of the present embodiment, FIGS. 19A and 19B are side views of the essential portions of FIG. 18, and FIGS. 20 to 22 are illustrations of the present embodiment.

FIGS. 19A and 19B show the case of the aspect ratio 16:9 and one-to-one magnification mode (both of the extender and the shrinker are absent in the optical path).

Figure 20:
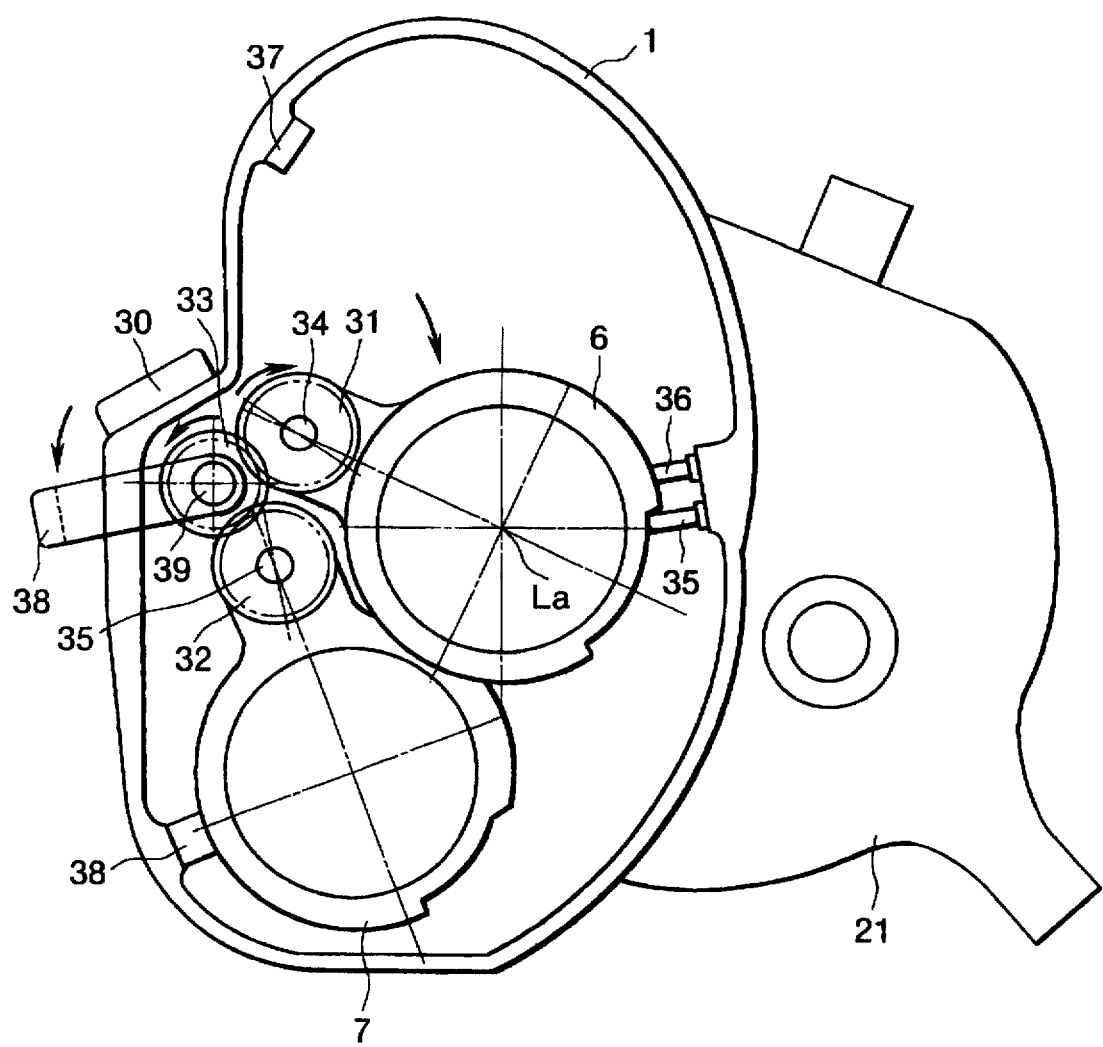
FIG. 20 is a cross-sectional view of the lens barrel according to still another embodiment of the present invention.

FIG. 20 shows the case of the aspect ratio 16:9 and two times mode (the extender is inserted in the optical path).

Figures 21A, 21B:
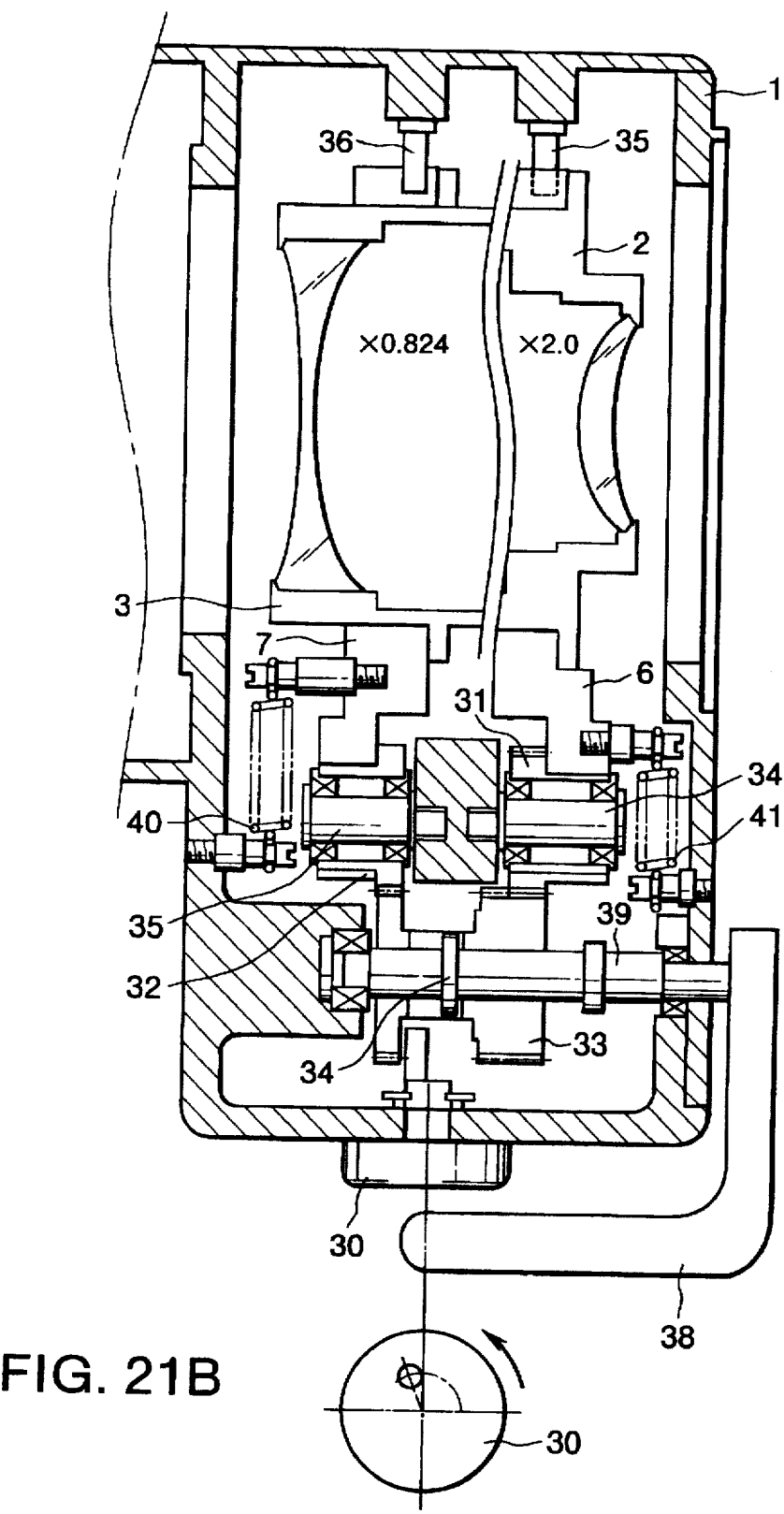
FIGS. 21A and 21B are cross-sectional views of the lens barrel according to still another embodiment of the present invention.

FIGS. 21A and 21B show the case of the aspect ratio 4:3 and 2.427 times mode (the extender is inserted in the optical path).

Figure 22:
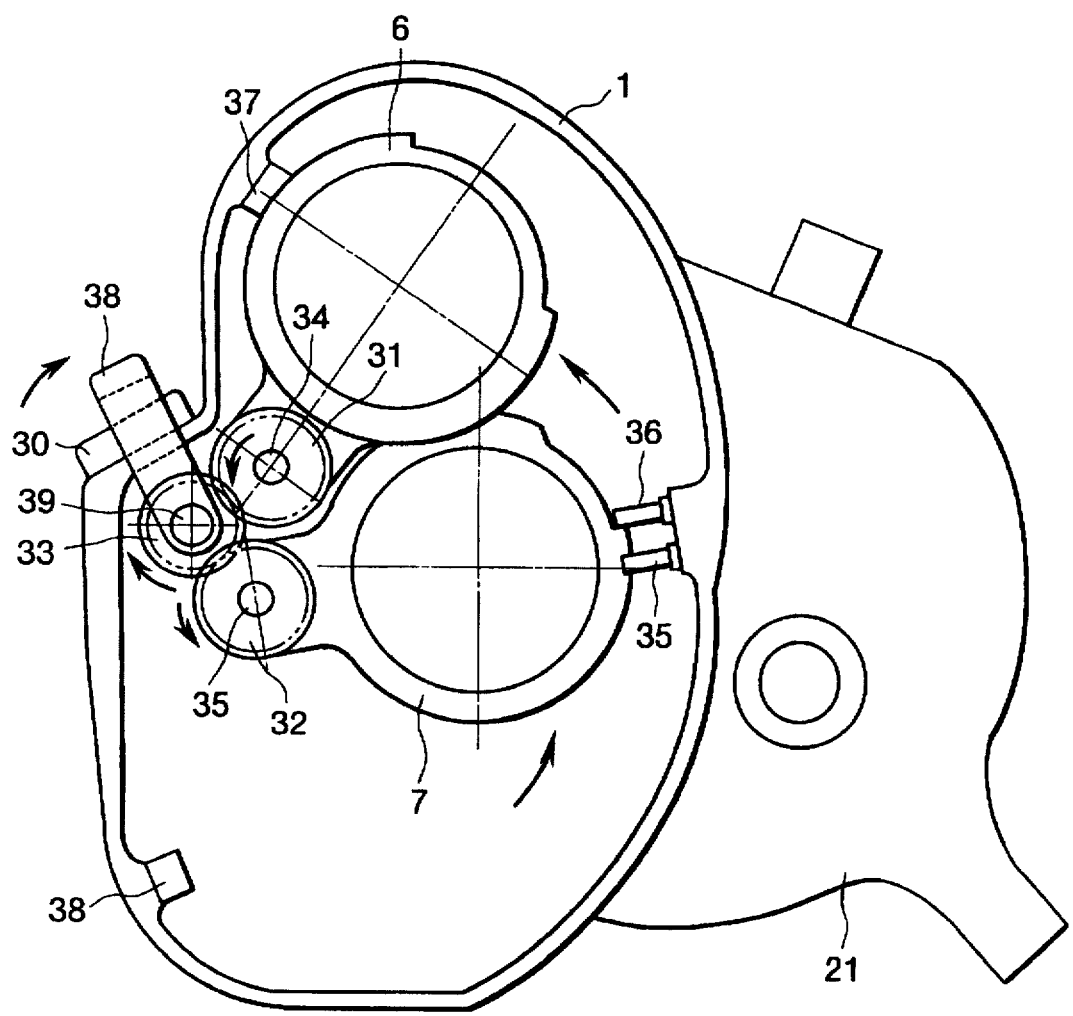
FIG. 22 is a side cross-sectional view of the lens barrel according to still another embodiment of the present invention.

FIG. 22 shows the case of the aspect ratio 4:3 and one-to-one magnification mode (the shrinker is inserted in the optical path).

Elements designated by the same reference characters as in the aforedescribed embodiment perform similar functions and therefore need not be described.

In FIGS. 18 to 22, the reference numeral 34 designates a rotary shaft which corresponds to the center of rotation of the extender barrel 2. The reference numeral 35 denotes a rotary shaft which corresponds to the center of rotation of the shrinker barrel 3. The reference numeral 6 designates a sector which holds the rotary shaft 34 and the extender lens 2. The reference numeral 7 denotes a sector which holds the rotary shaft 35 and the shrinker lens 3. The reference numeral 38 designates a changeover lever as an operating member which selectively removably mounts the extender lens 2 and the shrinker lens 3 in the optical path. The reference numeral 39 denotes a lever shaft on which the changeover lever 38 is mounted. The reference numeral 30 designates a changeover knob as an element of connection releasing means and aspect ratio setting means. The changeover knob 30 is operated with the changeover from the mode of the aspect ratio (second aspect ratio) 4:3 to the mode of the aspect ratio (first aspect ratio) 16:9. The reference numeral 31 denotes a gear as extender changeover means. The gear 31 is fixed to the sector 6 and in FIG. 18, it is in meshing engagement with a clutch gear (connecting means) 33. The reference numeral 32 designates a gear as converting lens changeover means. The gear 32 is fixed to the sector 7 and is capable of meshing with the clutch gear 33.

The clutch gear 33 is slidable in the axial direction of the lever shaft 39 and rotatable with the rotation of the lever shaft 39. The clutch gear 33 slides to thereby mesh with only the gear 31 or with both of the gear 31 and the gear 32. The reference numeral 34 denotes a pin which transmits the rotation of the lever shaft 39 to the clutch gear 33. The reference numeral 35 designates a stopper which holds the sector 6 for holding the extender barrel 2 on the optical axis.

The reference numeral 36 denotes a stopper which holds the sector 7 for holding the shrinker barrel 3 on the optical axis. The reference numeral 37 designates a stopper which holds the sector 6 in a position wherein the extender barrel 2 is retracted from the optical axis. The reference numeral 38 denotes a stopper which holds the sector 7 in a position wherein the shrinker barrel 3 is retracted from the optical axis La of the photo-taking system. The reference numeral 41 designates a spring which resiliently holds the extender barrel 2 and the sector 6. The reference numeral 40 denotes a spring which resiliently holds the shrinker barrel 3 and the sector 7.

In the present embodiment, with one of the extender and the shrinker removably inserted or neither of them inserted in a portion of the zoom lens (photo-taking system), for example, the optical path of a relay lens, the changeover of the aspect ratio and the enlargement (magnification) of the zoom range are coped with. The construction of the used states of the extender and shrinker in each mode at this time is as shown in the table below.

TABLE 3

| Aspect ratio | Enlargement magnification of zoom range | Lens unit disposed on the optical axis of a portion (relay lens) of photo-taking system | Corresponding figure |
| --- | --- | --- | --- |
| 16:9 | one-to-one | none | FIG. 18 |
| 16:9 | two times | extender | FIG. 20 |
| 4:3 | one-to-one | shrinker | FIG. 22 |
| 4:3 | 2.427 times | extender | FIGS. 21A, 21B |

As shown in this table, there are four modes (photographing conditions) for two aspect ratios desired by the photographer. Actually, there are three kinds of disposition, i.e., a case where the extender and the shrinker are absent in the optical path, a case where the extender is disposed in the optical path, and a case where the shrinker is exposed in the optical path. As described with respect to the prior art, this is from the judgment that from the situation of use of the extender, the correction in a direction to extend the focal length is unnecessary. Accordingly, even when the same extender of two times is used, in the case of a mode of use of an extender of the aspect ratio 4:3, from

2/0.824=2.427, the focal length of the whole photo-taking system becomes a focal length of apparently 2.427 times.

In the case of a mode in which the aspect ratio is 16:9 (a mode of the aspect ratio 16:9), the shrinker barrel 3 is always in a state retracted from the optical axis La. By the extender changeover lever 38 being operated, only the extender barrel 2 is removably inserted onto the optical axis to thereby vary the focal length range of the whole system to one-to-one magnification (one-to-one magnification mode) and two times (two times mode). Also, in the case of a mode in which the aspect ratio is 4:3 (a mode of the aspect ratio 4:3), the extender changeover means 31 and the shrinker changeover means 32 are connected together by the connecting means 33 which is a clutch gear so that one of the shrinker barrel 3 and the extender barrel 2 may be disposed on the optical axis La without fail by one operation of the operating member 38. That is, the shrinker barrel 3 and the extender barrel 2 are connected together by the clutch gear 33 so as to be moved at a time by one operation of the changeover lever 38.

The operation at this time will now be described in accordance with the operation of the changeover lever 38.

FIGS. 18, 19A and 19B show cases where the aspect ratio is 16:9 and the whole system not using the extender is at one-to-one magnification (the aspect ratio 16:9, one-to-one magnification mode). At this time, as shown in the table above, the extender barrel 2 and the shrinker barrel 3 are both disposed at positions retracted from the optical axis La.

When in this state, the changeover lever 38 is operated, the lever shaft 39 on which the changeover lever 38 is mounted is rotated and the clutch gear 33 is also rotated therewith through the pin 34. Since the clutch gear 33 is in meshing engagement with the gear 31, the gear 31 is rotated to thereby rotate the sector 6. Thereby, as shown in FIG. 20, the extender barrel 2 is disposed on the optical axis La. At this time, the mode becomes a mode in which the aspect ratio is 16:9 and the focal length range of the whole system has been enlarged to two times (the aspect ratio 16:9, two times mode).

Also, when conversely, the changeover lever 38 is returned to its original position, the same member is reversely rotated to thereby retract the extender barrel 2 from the optical axis La. In the meantime, the clutch gear 33 does not at all touch the gear 32 provided on the shrinker barrel 3 side and accordingly, the shrinker barrel 3 remains retracted from the optical path. At this time, the mode becomes a mode in which the aspect ratio is 16:9 and the focal length range of the whole system is unchanged, i.e., one-to-one magnification (the aspect ratio 16:9, one-to-one magnification mode).

As described above, in the present embodiment, when the aspect ratio (first aspect ratio) 16:9 mode is selected, only the extender lens is changed over by the changeover lever 38.

Description will now be made of the case of a mode of the aspect ratio (second aspect ratio) 4:3.

As previously described, in the present invention, mode changeover is effected by the aspect ratio setting means 30 with the extender 2a disposed on the optical axis La and therefore, the changeover lever 38 is once operated to thereby dispose the extender barrel 2 on the optical axis La.

Here, the changeover knob 30 is rotated to effect mode changeover and the clutch gear 33 is pushed leftwardly as viewed in FIG. 19A by a projection 30a provided integrally with the changeover knob 30. As a result, as shown in FIGS. 21A and 21B, the clutch gear 33 slides on the lever shaft 39 and is fixed at a position in which it meshes with the gear 32 disposed in advance so as to mesh with the clutch gear 33. In this state, the changeover lever 38 is in the position of extender ON and therefore, when it is returned to its original position, the extender barrel 2 is retracted from the optical axis by the transmission of the rotation of the clutch gear 33 and the gear 31 as in the case of the aspect ratio 16:9 mode.

The rotation is likewise transmitted to another gear 32 with which the clutch gear 33 is in meshing engagement, and the sector 7 is rotated about the rotary shaft 35 through the gear 32, and the shrinker barrel 3 becomes operatively associated with the extender barrel 2, whereby the extender barrel 2 is moved toward the optical axis conversely to being retracted from the optical axis, and becomes positioned on the optical axis. Here, the angles by which the sector 6 and the sector 7 are rotatable are substantially the same and the speed reduction ratios of the clutch gear 33 and the gear 31 and of the clutch gear 33 and the gear 32 are the same.

Also, the meshing engagement among the gears 31, 32 and 33 is provided with a play sufficient to absorb the irregularity of the angle of rotation of each sector in the manufacture thereof. Therefore, design is made such that the sector 7 reliably strikes against the stopper 38 when the stopper 35 for positioning the extender barrel 2 at a position on the optical axis La is regulating the rotation of the sector 6.

Also, design is made such that the sector 6 reliably strikes against the stopper 7 when the stopper 36 for positioning the shrinker barrel 3 at a position on the optical axis La is regulating the rotation of the sector 7.

Thus, as shown in FIG. 22, the changeover knob 30 is rotated, whereafter the changeover lever 38 is operated, whereby the extender barrel 2 may be retracted from the optical axis and at the same time, the shrinker barrel 3 may be disposed on the optical axis. Thereby, there is brought about a mode of an aspect ratio 4:3 and one-to-one magnification (the aspect ratio 4:3, one-to-one magnification mode).

When from this state, the changeover lever 38 is again returned to its original position, the shrinker barrel 3 is retracted from the optical axis and at the same time, the extender barrel 2 becomes again positioned on the optical axis. Thereby, there is brought about a mode in which the aspect ratio is 4:3 and the focal length range of the whole system has been displaced by 2.427 times toward a longer one (the aspect ratio 4:3, 2.427 times mode).

In the present embodiment, even in the case of a photographing mode of the aspect ratio 4:3, the shrinker barrel 3 and the extender barrel 2 become removably inserted in operatively associated relationship with each other, and after a mode has once been set, as in the case of the aspect ratio 16:9, the extender operation is made possible by only the operation of the changeover lever 38, like the prior-art photo-taking lens which does not constitute a shrinker. After the extender has been returned onto the optical axis, the mode changeover knob 30 is again rotated, that is, the connection of the connecting means 33 is released to return it to its original position, whereupon photographing at the aspect ratio 16:9 again becomes possible.

It has been described that when the mode changeover knob 30 is operated when the extender barrel 2 is on the optical axis as described above, the mode changeover of the aspect ratio 16:9 and the aspect ratio 4:3 is possible, but when the photographer effects mode changeover by mistake during photographing in the aspect ratio 16:9 mode and at one-to-one magnification, the extender barrel 2 and the shrinker barrel 3 will become operatively associated with each other while being both retracted from the optical axis, and the changeover lever 38 will become unmovable in any direction.

In order to avoid the photographer's wrong operation so as not to fall into such a state, in the present embodiment, when as shown in FIGS. 21A and 21B, the changeover lever 38 is in one-to-one magnification position, a portion (inhibiting means) 38a of this changeover lever 38 is disposed so as to cover the mode changeover knob 30. Thus, design is made such that the changeover during one-to-one magnification which poses a problem in operation is made impossible and the photographer never operates wrongly.

While in the present embodiment, the angle of retraction at which the extender barrel 2 is retracted from the optical axis and the angle at which the shrinker barrel 3 is retracted from the optical axis have been described as being substantially the same, a great angle of retraction may be secured for only the extender barrel 2 or only the shrinker barrel 3, and the speed reduction ratios between the clutch gear 33 and the gear 31 and between the clutch gear 33 and the gear 32 referred to in FIGS. 19A and 19B may be changed to ones conforming to the angle of retraction.

Figure 25:
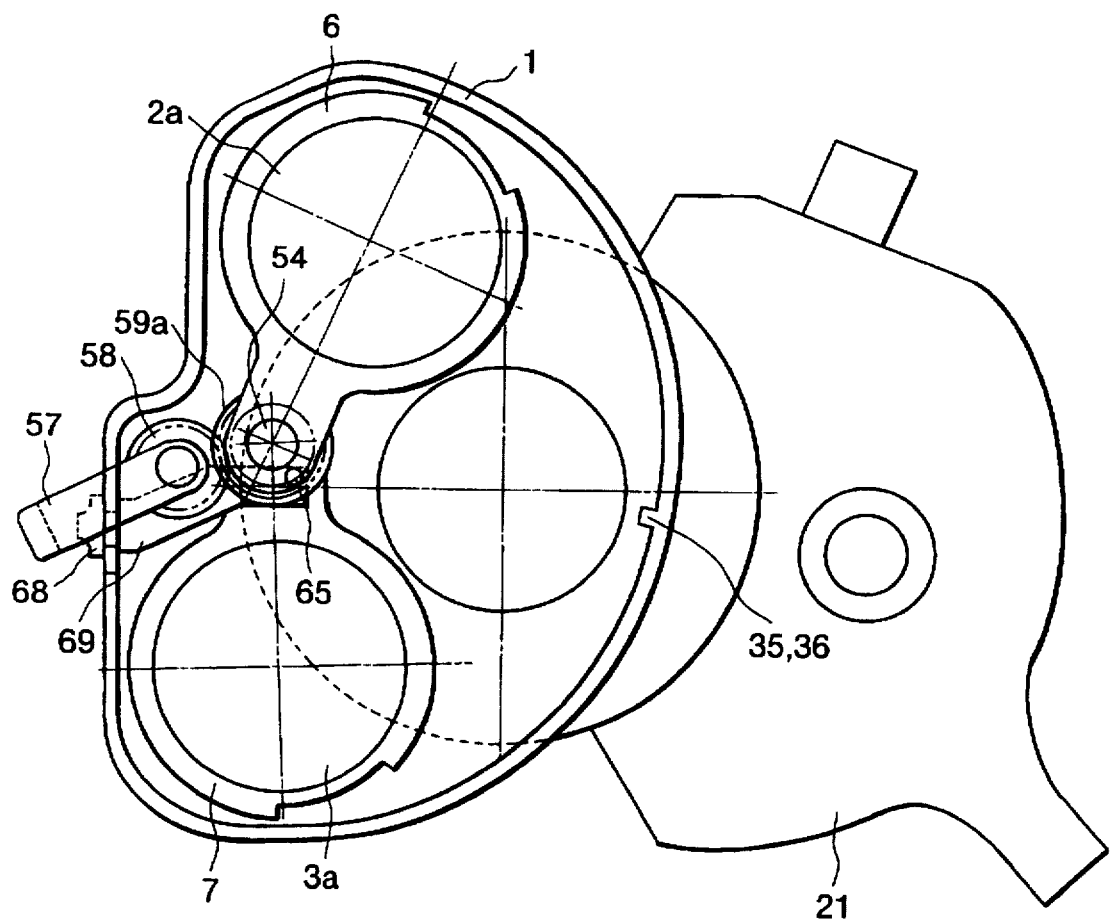
FIG. 25 is a cross-sectional view of the lens barrel according to still another embodiment of the present invention.

FIG. 25 shows the case of the aspect ratio 16:9, one-to-one magnification mode (neither of the extender 2a and the shrinker (converting lens) 3a is present in the optical path).

Figure 23:
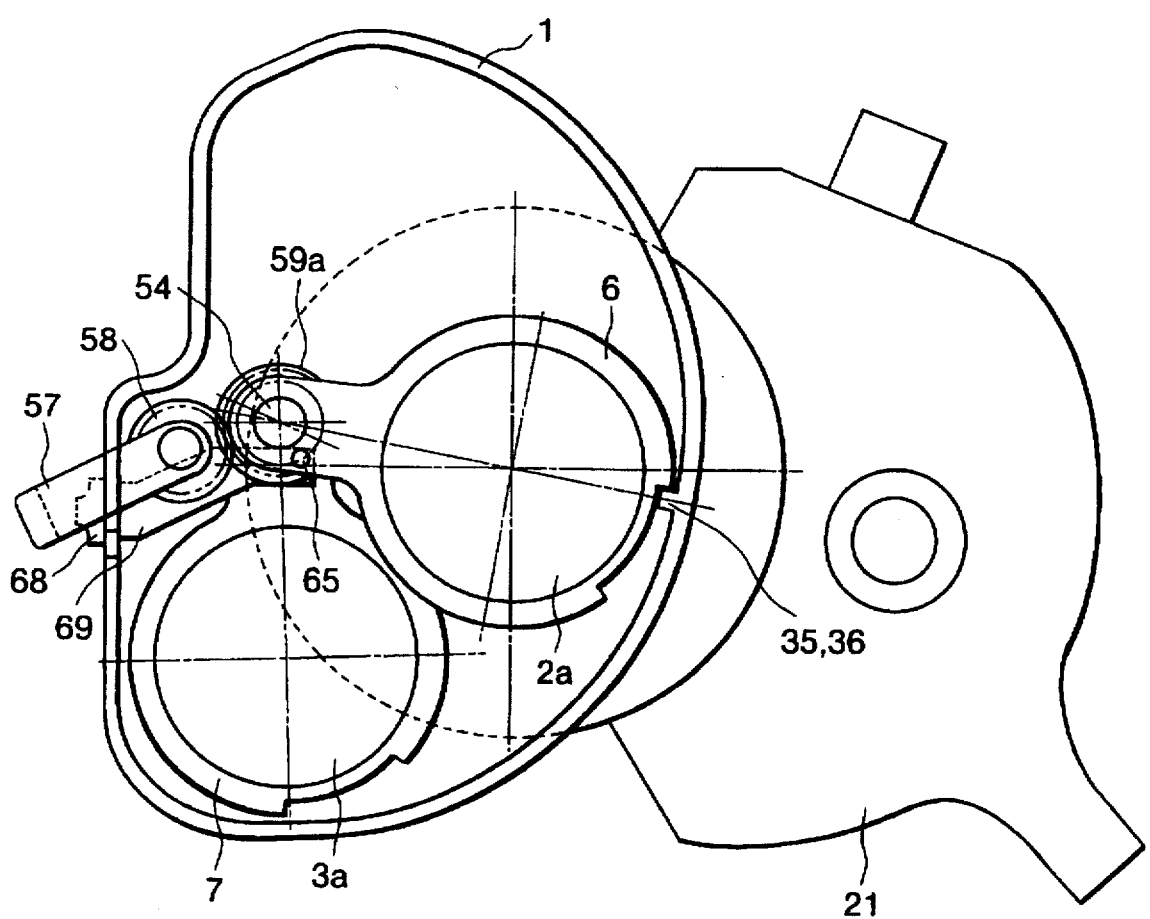
FIG. 23 is a cross-sectional view of a lens barrel according to still another embodiment of the present invention.
Figure 24:
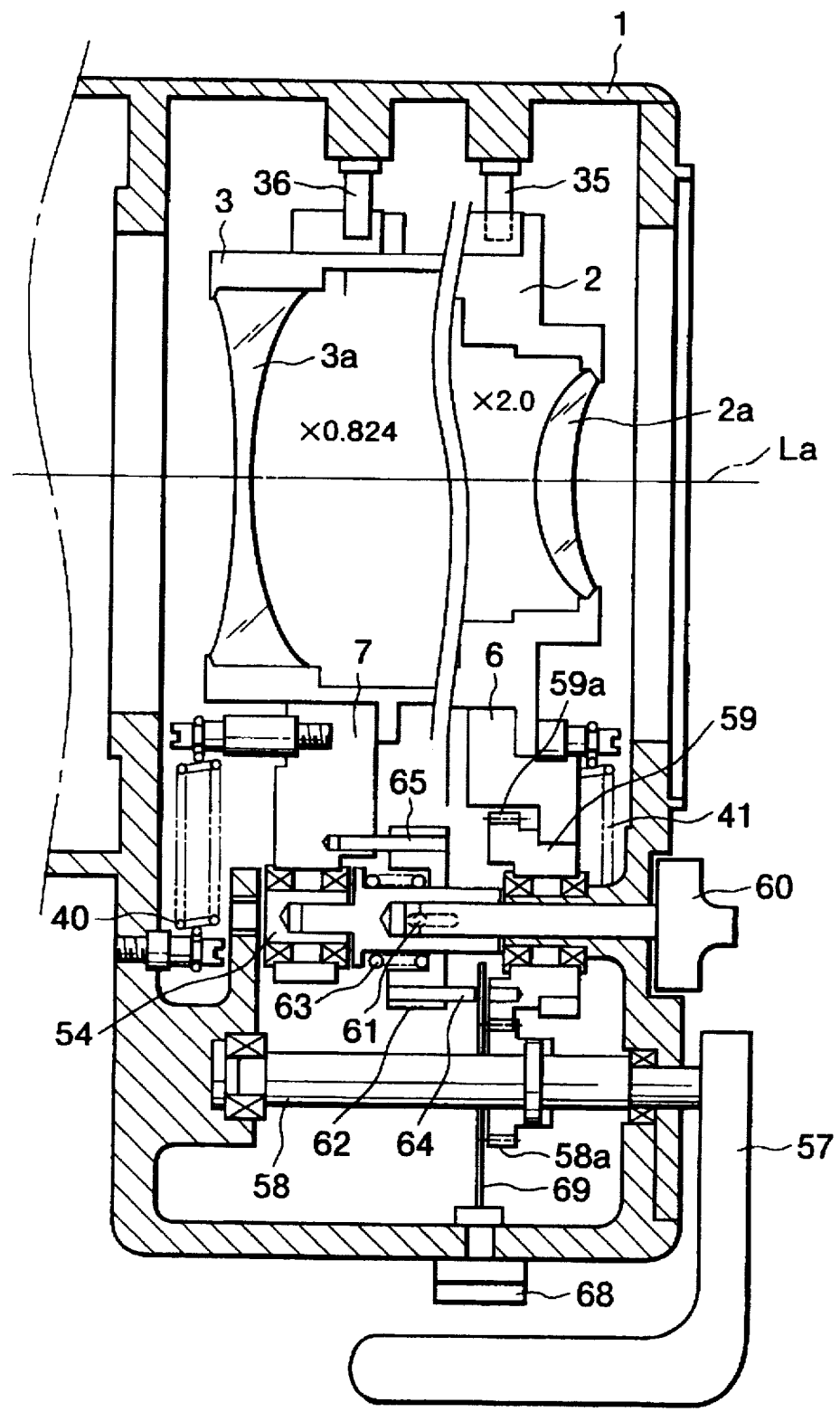
FIG. 24 is a side cross-sectional view of the lens barrel according to still another embodiment of the present invention.

FIGS. 23 and 24 show the case of the aspect ratio 16:9, two times mode (the extender is inserted in the optical path).

Figure 26:
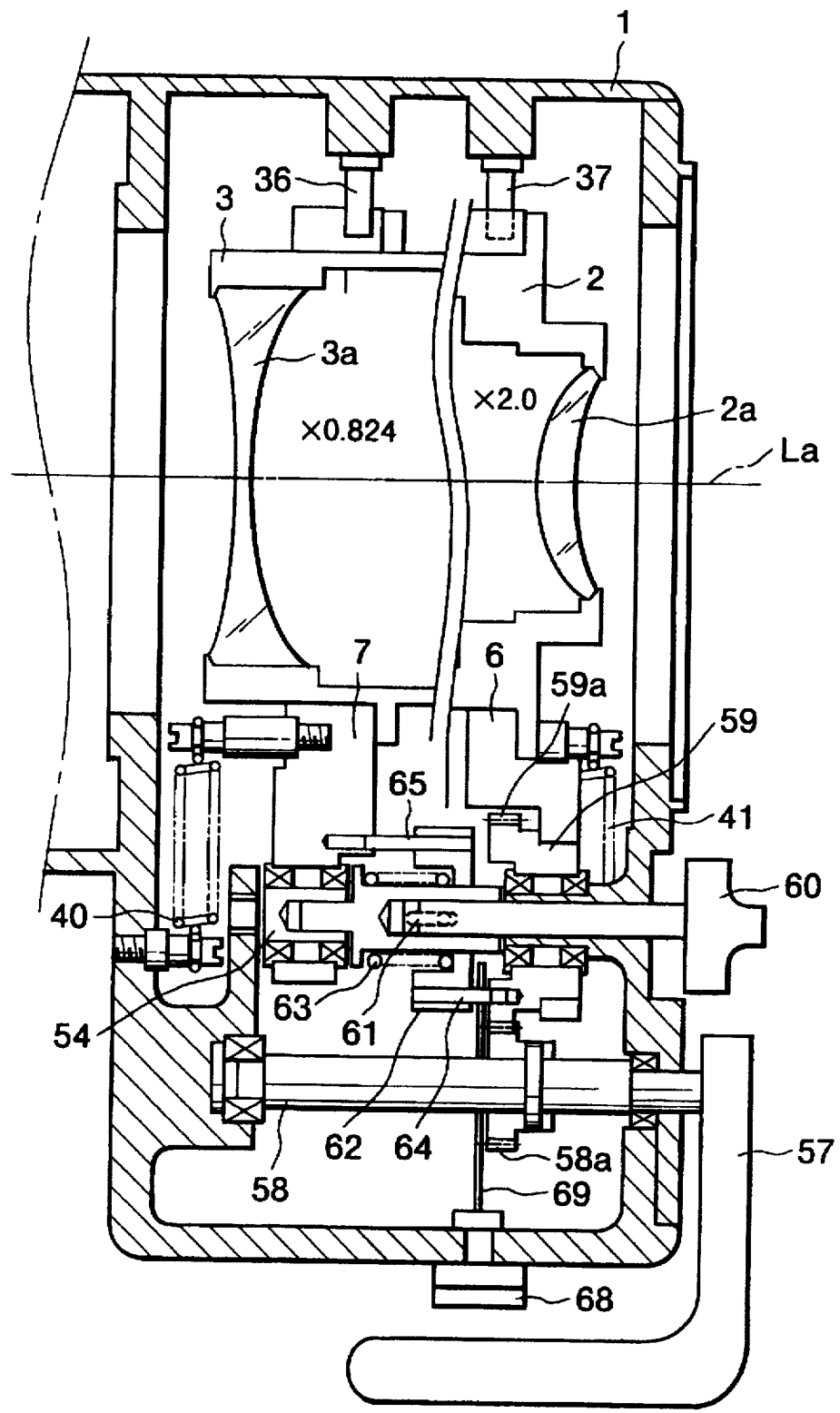
FIG. 26 is a side cross-sectional view of the lens barrel according to still another embodiment of the present invention.
Figure 27:
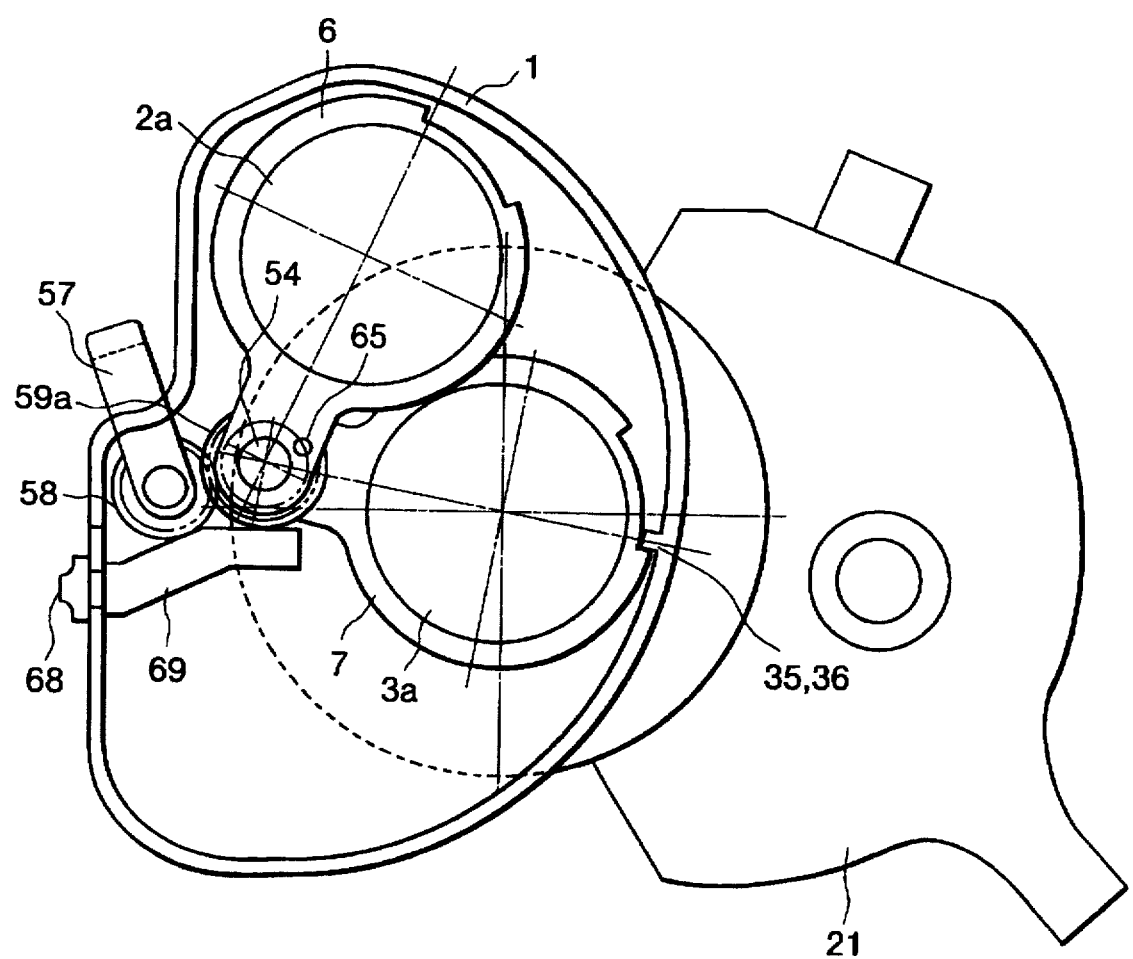
FIG. 27 is a cross-sectional view of the lens barrel according to still another embodiment of the present invention.

FIGS. 26 and 27 show the case of the aspect ratio 4:3, one-to-one magnification mode (the shrinker is inserted in the optical path).

The reference numeral 54 designates a rotary shaft which corresponds to the center of rotation of the extender barrel 2 and of the shrinker barrel 3. The reference numeral 6 denotes a sector which fixes the rotary shaft 54 and the extender barrel 2. The reference numeral 7 designates a sector which files the rotary shaft 54 and the shrinker barrel 3. The reference numeral 57 denotes a changeover lever as an operating member on which the extender barrel 2 and the shrinker barrel 3 are mounted for selective removable insertion into the optical path. The reference numeral 58 designates a lever shaft on which the changeover lever 57 is mounted.

The lever shaft 58 has a gear 58a thereon. The reference numeral 59 denotes a gear member fixed to the rotary shaft 54. A gear 59a provided on the outer periphery of the gear member 59 is shown as being in meshing engagement with the gear 58a on the lever shaft 58 in FIGS. 23 and 24. The rotary shaft 54, the sector 6 and the gear member 59 together constitute an element of extender changeover means. The rotary shaft 54, the sector 7, etc. together constitute an element of converting lens changeover means.

The reference numeral 60 designates a clutch knob. The reference numeral 61 denotes a connecting pin which connects a clutch body 62 and the clutch knob 60 together. The clutch body 62 is operatively associated with the rotation of the clutch knob 60 and the connecting pin 61 and is rotatable about the rotary shaft 54. The reference numeral 63 designates a spring which biases the clutch body 62 toward the optical axis La. The reference numeral 64 denotes a clutch pin fixed to the clutch body 62. The clutch pin 64 slides in the direction of the optical axis to thereby effect the connection thereof to the gear member 59 and the release of the connection. The reference numeral 65 designates a clutch pin fixed to the clutch body 62 and connected to the sector 7.

The reference numeral 68 denotes a mode fixing switch, and the reference numeral 69 designates a mode fixing plate which is fixed to the mode fixing switch 68 and prevents the connection between the clutch pin 64 and the gear member 59. The mode fixing switch 68, the clutch knob 60 and the clutch body 62 together constitute an element of mode changeover means.

In the present embodiment, the construction of the used states of the extender and shrinker in each mode is as shown in the table below.

TABLE 4

| Aspect ratio | Enlargement magnification of zoom range | Lens unit disposed on the optical axis of a portion (relay lens) of photo-taking system | Corresponding figure |
| --- | --- | --- | --- |
| 16:9 | one-to-one | none | FIG. 25 |
| 16:9 | two times | extender | FIGS. 23 and 24 |
| 4:3 | one-to-one | shrinker | FIGS. 26 and 27 |
| 4:3 | 2.427 times | extender | FIGS. 23 and 24 |
| 4:3 | 1.214 times | none | FIG. 25 |

In the present embodiment, as shown in the table above, there are five modes (photographing conditions) for two aspect ratios desired by the photographer. Actually, there are three kinds of disposition, i.e., a case where the extender and the shrinker are absent in the optical path, a case where the extender is disposed in the optical path, and a case where the shrinker is disposed in the optical path. As described with respect to the conventional art, this is from the judgment that from the situation of use of the extender, the correction in a direction to extend the focal length is unnecessary. Accordingly, even when the same extender of two times is used, in the case of a mode of use of an extender of the aspect ratio 4:3, from

2/0.824=2.427, the focal length of the whole photo-taking system becomes a focal length of apparently 2.427 times.

Also, in the case of the mode of the aspect ratio 4:3, if the extender and the shrinker are both retracted from the optical path, as the reason why the shrinker is required, the focal length will extend toward the telephoto side as previously described and therefore, a hindrance will occur in the photographing at a wide angle. However, if the shrinker is constructed and this problem is solved, it will be possible to utilize this nature as in the present embodiment and utilize an extender of apparently low magnification as being inserted. In this case, the apparent magnification of the extender is 1.214 times which is an inverse number of the magnification of the shrinker.

In the present embodiment, when a mode in which the aspect ratio is 16:9 (the aspect ratio 16:9 mode) is set by aspect ratio setting means (not shown) on the camera body side, the shrinker barrel 3 is always in its retracted state from the optical axis La.

The changeover lever 57 is operated to thereby removably insert only the extender barrel 2 onto the optical axis and vary the focal length range of the whole system to the one-to-one magnification (one-to-one magnification mode) of FIG. 25 and the two times (two times mode) of FIG. 23. Also, in the case of the mode in which the aspect ratio is 4:3 (the aspect ratio 4:3 mode), by the operation of the changeover lever 57, the shrinker barrel 3 or the extender barrel 2 may be positioned on the optical axis or both of them may be positioned off the optical axis. That is, by the operation of the changeover lever 57, their positions are changed to those of FIGS. 23, 25 and 27.

The operation at this time will now be described in accordance with the operation of the changeover lever 57.

FIGS. 23 and 24 show a case where the aspect ratio is 16:9, the extender is used and the whole system is at two times (the aspect ratio 16:9, two times mode). At this time, as shown in the previous table, the extender barrel 2 is disposed on the optical axis and the shrinker barrel 3 is disposed in a position retracted from the optical axis La.

When in this state, the changeover lever 57 is operated, the lever shaft 58 on which the changeover lever 57 is mounted is rotated and the gear 59a is also rotated therewith through the gear 58a. Since the gear member 59 is fixed to the sector 6, it rotates the sector 6. Thereby, as shown in FIG. 25, the extender barrel 2 is retracted from the optical axis La. At this, the mode becomes a mode in which the aspect ratio is 16:9 and the focal length range of the whole system is one-to-one magnification (the aspect ratio 16:9, one-to-one magnification mode).

When conversely, the changeover lever 57 is returned to its original position, the same member is reversely rotated and the extender barrel 2 is positioned on the optical axis La. In the meantime, the clutch pin 64 provided on the clutch body 62 operatively associated with the shrinker barrel 3 side is prevented from being connected to the gear member 59 by the mode fixing plate 69. Accordingly, the shrinker barrel 3 remains retracted from the optical path. At this time, the mode becomes a mode in which the aspect ratio is 16:9 and the focal length range of the whole system is two times (the aspect ratio 16:9, two times mode).

As described above, in the present embodiment, when the aspect ratio (first aspect ratio) 16:9 mode is selected, the operation of the extender is effected by only the changeover operation of the changeover lever 57 as in the prior-art photo-taking lens which does not constitute a shrinker.

Description will now be made of the case of the mode of the aspect ratio (second aspect ratio) 4:3.

When the aspect ratio 4:3 mode is selected by the aspect ratio setting means (not shown) on the camera body side or the lens side, the mode fixing switch 58 is released on the lens side and the mode fixing plate 69 is slidden and retracted. The clutch knob 60 is then rotated to thereby fit the clutch pin 64 biased by the spring 63 into an aperture formed in the gear member 59. Thereby, the connection between the converting lens changeover means and the extender changeover means or the operating member is effected (when the aspect ratio is 16:9, the clutch knob 60 is slidden in the direction of the optical axis against the force of the spring 63 to thereby release the connection between the clutch pin 64 and the gear member 59, and then the mode fixing switch 68 is changed over to thereby release the connection between the converting lens changeover means and the extender changeover means.

First, the retraction of the extender barrel 2 from the optical axis to the positions of FIGS. 23 to 25 is effected by rotating the changeover lever 57 as in the aspect ratio 16:9 mode previously described. However, as shown in the previous table, in the aspect ratio 4:3 mode, use is made with the case of FIG. 25 where the extender is absent as 1.214 times, and with the case of FIG. 23 where the extender is present as 2.427 times.

The changeover lever 57 is then further rotated from the state of FIG. 25. By this operation of the changeover lever 57, the lever shaft 58 is rotated and the clutch body 62 and the sector 7 are rotated about the rotary shaft 54 through the gear 58a and the clutch pin 64, whereby the shrinker barrel 3 is disposed on the optical axis.

Thereby, as shown in FIG. 26, the shrinker barrel 3 is positioned on the optical axis. At this time, the mode is a one-to-one magnification mode of the aspect ratio 4:3.

If the mode fixing switch 68 is changed over by a procedure converse to the above-described operation, the mode can be returned to the mode of the aspect ratio 16:9.

In the present invention, design is made such that the changeover shaft of the changeover lever 57 is left of the optical axis as viewed from the camera side, but alternatively, design may be made such that the changeover shaft is right of the optical axis. Also, design may be made such that the shrinker barrel 3 is retracted upwardly and the extender barrel 2 is retracted downwardly.

In the present embodiment, the magnification of the extender has been described as two times, but the extender may be designed at any other magnification. Also, when for a camera having an image pickup element of which the aspect ratio of the image pickup surface is 4:3, the image field of the aspect ratio 16:9 which is an area thereof is to be photographed, a vertical portion of the image field is not used, but the central area of the aspect ratio 16:9 may be used or in this case, the magnification of the shrinker may be changed to 0.917 times, thereby coping with it. Also, even when the aspect ratio differs, a shrinker magnification conforming thereto may likewise be adopted to thereby cope with it.

According to the present invention, as described above, there can be achieved an image pickup apparatus capable of changing over the aspect ratio wherein in a photo-taking system having a converting lens (shrinker) and an extender for the changeover of the aspect ratio, a driving mechanism for effecting the removable insertion of the both lenses into the optical path is appropriately set, whereby the extender or the shrinker may easily or may not be positioned in the optical path and photographing can be effected easily at a predetermined aspect ratio and one-to-one magnification or different magnifications (focal length range).

Particularly, the present invention can cope with a camera with the aspect ratio changeover function which does not give a feeling of physical disorder to any photographer accustomed to the photographing operation of a zoom lens for a prior-art handy camera with an extender and which enables a quick extender operation by the operation of a changeover lever similar to that of the prior art.

Also, after the photographer has once selected an aspect ratio, he can be conscious of only the selection of one-to-one magnification and the extender as in the prior art and therefore, these make it unnecessary for the photographer to newly learn to use the new function of changing over the aspect ratio, and the eclipse of a photographed image which is a mistake absolutely unallowable in photographing can be effectively prevented.

Also, in the photographing in the aspect ratio 4:3 mode, the extender function of the order of 1.2 times can be realized without newly adding any optical system besides the shrinker prepared for one-to-one magnification. Thus, even when during photographing in a dark place, the use of an extender of two times reduces the quantity of light to half and therefore it is difficult to enlarge the focal length, it becomes possible to minimize the reduction in the quantity of light and make the focal length on the telephoto side equal to that of a lens ranking above by one class, and an extender of a little over 2.4 times can be provided and the range of selection can be more widened for the photographer.

What is claimed is:

1. An objective lens for application to an image pickup apparatus of which the size of the image pickup surface is changeable over between a first mode having a first aspect ratio and a second mode having a second aspect ratio, said objective lens comprising:

first optical means for extending the focal length of said objective lens;

second optical means for shrinking the focal length of said objective lens;

an operating member; and a transmitting mechanism for transmitting the operating force of said operating member to said first optical means under said first mode, and transmitting the operating force of said operating member to said first and second optical means under said second mode;

wherein by the operation of said operating member, under said first mode, said first optical means is removably insertable into the optical path of said objective lens, and under said second mode, each of said first and second optical means is removably insertable into the optical path of said objective lens.

2. An objective lens according to claim 1, wherein said first optical means is rotatable about a first shaft, said second optical means is rotatable about a second shaft, and said first and second optical means are rotated about said first and second shafts, respectively, whereby they are removably insertable into the optical path of said objective lens.

3. An objective lens according to claim 1, wherein the first aspect ratio is 16:9.

4. An objective lens according to claim 1, wherein the second aspect ratio is 4:3.

5. An objective lens according to claim 1, wherein said transmitting mechanism inhibits the transmission of the operating force of said operating member under said first mode.

6. An objective lens according to claim 2, wherein the center of rotation of said operating member has a rotatable gear thereon, said first and second shafts have a first gear and a second gear, respectively, thereon, the teeth of said rotatable gear and said first gear normally mesh with one another, and under said second mode, said rotatable gear and said second gear mesh with each other.

* * * * *

UNITED STATES PATENT AND TRADEMARK OFFICE
CERTIFICATE OF CORRECTION

PATENT NO. : 5,696,634
DATED : December 9, 1997
INVENTOR(S) : ITARU WATANABE, ET AL.

It is certified that error appears in the above-identified patent and that said Letters Patent is hereby corrected as shown below:

Title page, item
[56] References Cited (U.S. PATENT DOCUMENTS)

"Matsubsita" should read --Matsushita--.

[56] References Cited (OTHER PUBLICATIONS)

"No. 18," should be deleted.

COLUMN 1

Line 22, "of the " should read --the--.
Line 50, "axises" should read --arises--.

COLUMN 4

Line 30, "of an" should read --an--.
Line 67, "as the" should read --the--.

COLUMN 8

Line 62, "designates" should read --designate--.

COLUMN 9

Line 4, "anyway" should read --any way--.
Line 41, "these" should read --this--.

UNITED STATES PATENT AND TRADEMARK OFFICE
CERTIFICATE OF CORRECTION

PATENT NO. : 5,696,634
DATED : December 9, 1997
INVENTOR(S) : ITARU WATANABE, ET AL.

It is certified that error appears in the above-identified patent and that said Letters Patent is hereby corrected as shown below:

COLUMN 10

Line 55, "slidden" should read --slid--.

COLUMN 11

Line 22, "of the" should read --the--.
    Line 63, "both of" should read --both--.

COLUMN 15

Line 13, "files" should read --fixes--.

COLUMN 16

Line 20, "6e" should read --be--.

UNITED STATES PATENT AND TRADEMARK OFFICE
CERTIFICATE OF CORRECTION

PATENT NO. : 5,696,634
DATED : December 9, 1997
INVENTOR(S) : ITARU WATANABE, ET AL.

It is certified that error appears in the above-identified patent and that said Letters Patent is hereby corrected as shown below:

COLUMN 17

Line 15, "slidden" should read --slid--.
    Line 21, "slidden" should read --slid--.

COLUMN 18

Line 11, "the both" should read --both--.
    Line 39, "when" should be deleted.

Signed and Sealed this

Twenty-second Day of September, 1998

Attest:

BRUCE LEHMAN

Attesting Officer     Commissioner of Patents and Trademarks